(12) United States Patent
Bassampour et al.

(10) Patent No.: US 12,379,611 B2
(45) Date of Patent: Aug. 5, 2025

(54) DIFFRACTIVE CONTACT LENSES

(71) Applicant: Alcon Inc., Fribourg (CH)

(72) Inventors: Zahra Bassampour, Alpharetta, GA (US); Chandana Kolluru, Suwanee, GA (US); Steve Yun Zhang, Sugar Hill, GA (US); Adam K. Sniady, Lilburn, GA (US); Thomas M. Moy, Cumming, GA (US); Frank Chang, Cumming, GA (US); David Borja, Suwanee, GA (US); Joseph Michael Lindacher, Suwanee, GA (US); Ying Pi, Suwanee, GA (US)

(73) Assignee: Alcon Inc., Fribourg (CH)

( * ) Notice: Subject to any disclaimer, the term of this patent is extended or adjusted under 35 U.S.C. 154(b) by 678 days.

(21) Appl. No.: 17/838,358

(22) Filed: Jun. 13, 2022

(65) Prior Publication Data
US 2023/0004023 A1 Jan. 5, 2023

Related U.S. Application Data

(60) Provisional application No. 63/210,193, filed on Jun. 14, 2021.

(51) Int. Cl.
*C08G 77/14* (2006.01)
*C08J 3/075* (2006.01)
*G02C 7/04* (2006.01)

(52) U.S. Cl.
CPC .......... *G02C 7/049* (2013.01); *C08G 77/14* (2013.01); *C08J 3/075* (2013.01); *G02C 7/041* (2013.01); *C08J 2483/06* (2013.01)

(58) Field of Classification Search
CPC combination set(s) only.
See application file for complete search history.

(56) References Cited

U.S. PATENT DOCUMENTS

| 3,408,429 | A | | 10/1968 | Wichterle |
| 4,136,250 | A | * | 1/1979 | Mueller ............ A01N 25/04 |
| | | | | 504/366 |
| 4,153,641 | A | | 5/1979 | Deichert et al. |
| 4,182,822 | A | | 1/1980 | Chang |

(Continued)

FOREIGN PATENT DOCUMENTS

| CN | 105467617 A | 4/2016 |
| EP | 0632329 A1 | 1/1995 |

(Continued)

OTHER PUBLICATIONS

Perez-Prados, et al., "Soft Multifocal Simultaneous Image Contact Lenses: Review", Clin. Exp. Optom. 2017, 100: pp. 107-127.

*Primary Examiner* — Peter A Salamon
(74) *Attorney, Agent, or Firm* — Jian Zhou

(57) ABSTRACT

The invention provides a delamination-resistant embedded silicone hydrogel contact lens having an insert that is embedded in a silicone hydrogel bulk material. The insert is made of a crosslinked polymeric material having a refractive index higher than that of the silicone hydrogel bulk material by at least 0.07 and comprises a diffractive structure disposed on one of the front and back curve surfaces of the insert for providing a diffractive power that contributes to the overall optical power of the contact lens.

19 Claims, 1 Drawing Sheet

(56) References Cited

U.S. PATENT DOCUMENTS

| | | |
|---|---|---|
| 4,189,546 A | 2/1980 | Deichert et al. |
| 4,210,391 A | 7/1980 | Cohen |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek |
| 4,338,005 A | 7/1982 | Cohen |
| 4,340,283 A | 7/1982 | Cohen |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,637,697 A | 1/1987 | Freeman |
| 4,641,934 A | 2/1987 | Freeman |
| 4,642,112 A | 2/1987 | Freeman |
| 4,655,565 A | 4/1987 | Freeman |
| 4,661,575 A | 4/1987 | Tom |
| 4,684,538 A | 8/1987 | Klemarczyk |
| 4,703,097 A | 10/1987 | Wingler et al. |
| 4,830,481 A | 5/1989 | Futhey et al. |
| 4,833,218 A | 5/1989 | Lee |
| 4,837,289 A | 6/1989 | Mueller et al. |
| 4,881,804 A | 11/1989 | Cohen |
| 4,881,805 A | 11/1989 | Cohen |
| 4,929,693 A | 5/1990 | Akashi |
| 4,936,666 A | 6/1990 | Futhey |
| 4,954,586 A | 9/1990 | Toyoshim et al. |
| 4,954,587 A | 9/1990 | Mueller |
| 4,995,714 A | 2/1991 | Cohen |
| 4,995,715 A | 2/1991 | Cohen |
| 5,010,141 A | 4/1991 | Mueller |
| 5,034,461 A | 7/1991 | Lai et al. |
| 5,039,761 A | 8/1991 | Ono et al. |
| 5,054,905 A | 10/1991 | Cohen |
| 5,056,908 A | 10/1991 | Cohen |
| 5,070,170 A | 12/1991 | Robertson et al. |
| 5,070,215 A | 12/1991 | Bambury et al. |
| 5,076,684 A | 12/1991 | Simpson et al. |
| 5,079,319 A | 1/1992 | Mueller |
| 5,100,226 A | 3/1992 | Freeman |
| 5,104,212 A | 4/1992 | Taboury et al. |
| 5,114,220 A | 5/1992 | Baude et al. |
| 5,116,111 A | 5/1992 | Simpson et al. |
| 5,117,306 A | 5/1992 | Cohen |
| 5,120,120 A | 6/1992 | Cohen |
| 5,121,979 A | 6/1992 | Cohen |
| 5,121,980 A | 6/1992 | Cohen |
| 5,166,345 A | 11/1992 | Akashi et al. |
| 5,229,797 A | 7/1993 | Futhey et al. |
| 5,346,946 A | 9/1994 | Yokoyama et al. |
| 5,358,995 A | 10/1994 | Lai et al. |
| 5,387,632 A | 2/1995 | Lai et al. |
| 5,416,132 A | 5/1995 | Yokoyama et al. |
| 5,449,729 A | 9/1995 | Lai |
| 5,451,617 A | 9/1995 | Lai et al. |
| 5,486,579 A | 1/1996 | Lai et al. |
| 5,508,317 A | 4/1996 | Müller |
| 5,527,925 A | 6/1996 | Chabrecek et al. |
| 5,583,163 A | 12/1996 | Müller |
| 5,748,282 A | 5/1998 | Freeman |
| 5,760,100 A | 6/1998 | Nicolson et al. |
| 5,760,871 A | 6/1998 | Kosoburd et al. |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger et al. |
| 5,962,548 A | 10/1999 | Vanderlaan et al. |
| 5,981,675 A | 11/1999 | Valint, Jr. et al. |
| 5,982,543 A | 11/1999 | Fiala |
| 6,017,121 A | 1/2000 | Chateau et al. |
| 6,019,914 A | 2/2000 | Lokshin et al. |
| 6,039,913 A | 3/2000 | Hirt et al. |
| 6,113,814 A | 9/2000 | Gemert et al. |
| 6,120,148 A | 9/2000 | Fiala et al. |
| 6,149,841 A | 11/2000 | Kumar |
| 6,166,236 A | 12/2000 | Bambury et al. |
| 6,217,171 B1 | 4/2001 | Auten et al. |
| 6,296,785 B1 | 10/2001 | Nelson et al. |
| 6,348,604 B1 | 2/2002 | Nelson et al. |
| 6,364,483 B1 | 4/2002 | Grossinger et al. |
| 6,536,899 B1 | 3/2003 | Fiala |
| 6,762,264 B2 | 7/2004 | Kunzler et al. |
| 6,867,245 B2 | 3/2005 | Iwata et al. |
| 6,951,391 B2 | 10/2005 | Morris et al. |
| 6,957,891 B2 | 10/2005 | Fiala |
| 7,025,456 B2 | 4/2006 | Morris et al. |
| 7,073,906 B1 | 7/2006 | Portney |
| 7,093,938 B2 | 8/2006 | Morris et al. |
| 7,156,516 B2 | 1/2007 | Morris et al. |
| 7,188,949 B2 | 3/2007 | Bandhauer et al. |
| 7,214,809 B2 | 5/2007 | Zanini et al. |
| 7,232,218 B2 | 6/2007 | Morris et al. |
| 7,423,074 B2 | 9/2008 | Lai et al. |
| 7,556,750 B2 | 7/2009 | Xiao et al. |
| 7,584,630 B2 | 9/2009 | Van Gemert |
| 7,605,190 B2 | 10/2009 | Moszner et al. |
| 7,891,810 B2 | 2/2011 | Legerton |
| 7,999,989 B2 | 8/2011 | Asai et al. |
| 8,038,293 B2 | 10/2011 | Reichert |
| 8,128,222 B2 | 3/2012 | Portney |
| 8,142,016 B2 | 3/2012 | Egerton et al. |
| 8,158,037 B2 | 4/2012 | Chopra et al. |
| 8,348,424 B2 * | 1/2013 | Pugh ............... B29D 11/00009 |
| | | 351/159.04 |
| 8,382,281 B2 | 2/2013 | Weeber |
| 8,415,405 B2 | 4/2013 | Maggio et al. |
| 8,475,529 B2 | 7/2013 | Clarke |
| 8,480,227 B2 | 7/2013 | Qiu et al. |
| 8,480,228 B2 | 7/2013 | Weeber |
| 8,513,325 B2 * | 8/2013 | Liu ..................... G02B 1/043 |
| | | 526/279 |
| 8,529,057 B2 | 9/2013 | Qiu et al. |
| 8,556,416 B2 | 10/2013 | Lawu |
| 8,573,775 B2 | 11/2013 | Weeber |
| 8,614,261 B2 | 12/2013 | Twata et al. |
| 8,658,748 B2 | 2/2014 | Liu et al. |
| 8,678,583 B2 | 3/2014 | Cohen |
| 8,697,770 B2 | 4/2014 | Duis et al. |
| 8,741,188 B2 | 6/2014 | Chopra et al. |
| 8,755,117 B2 | 6/2014 | Kobayashi et al. |
| 8,835,525 B2 | 9/2014 | Kuyu et al. |
| 8,993,651 B2 | 3/2015 | Chang et al. |
| 9,033,494 B2 | 5/2015 | Blum et al. |
| 9,052,438 B2 | 6/2015 | Xiao et al. |
| 9,097,840 B2 | 8/2015 | Chang et al. |
| 9,097,916 B2 | 8/2015 | Chopra et al. |
| 9,103,965 B2 | 8/2015 | Chang |
| 9,217,813 B2 | 12/2015 | Liu et al. |
| 9,310,624 B2 | 4/2016 | Argal et al. |
| 9,320,594 B2 | 4/2016 | Schwiegerling |
| 9,370,416 B2 | 6/2016 | Argal et al. |
| 9,465,234 B2 | 10/2016 | Chopra et al. |
| 9,475,827 B2 | 10/2016 | Chang et al. |
| 9,618,773 B2 * | 4/2017 | Clarke ..................... G02C 7/083 |
| 9,904,074 B2 | 2/2018 | Duis et al. |
| 10,081,697 B2 | 9/2018 | Huang et al. |
| 10,197,707 B2 | 2/2019 | Xiao et al. |
| 10,197,815 B2 | 2/2019 | Weeber |
| 10,209,533 B2 | 2/2019 | Schwiegerling |
| 10,301,451 B2 | 5/2019 | Jing et al. |
| 10,426,599 B2 | 10/2019 | Choi et al. |
| 10,463,474 B2 | 11/2019 | Lux et al. |
| 10,465,047 B2 | 11/2019 | Jing et al. |
| 10,524,899 B2 | 1/2020 | Lux et al. |
| 10,597,479 B2 * | 3/2020 | Chang ..................... C08G 77/20 |
| 10,618,233 B2 * | 4/2020 | Qiu ..................... B29D 11/00076 |
| 10,675,146 B2 | 6/2020 | Choi et al. |
| 10,676,557 B2 * | 6/2020 | Chang ..................... G02B 1/043 |
| 10,725,320 B2 | 7/2020 | Schwiegerling |

(56) References Cited

U.S. PATENT DOCUMENTS

| | | | |
|---|---|---|---|
| 10,870,722 B2* | 12/2020 | Huang | C08G 77/20 |
| 10,932,901 B2 | 3/2021 | Zheleznyak et al. | |
| 10,945,834 B2 | 3/2021 | Bor | |
| 11,433,629 B2* | 9/2022 | Lang | C08G 77/388 |
| 11,513,257 B2* | 11/2022 | Zheng | B29D 11/00048 |
| 2009/0202795 A1* | 8/2009 | Hayata | C08F 283/124 |
| | | | 428/195.1 |
| 2010/0079724 A1* | 4/2010 | Pugh | G02C 7/085 |
| | | | 351/159.75 |
| 2013/0166025 A1 | 6/2013 | Pugh et al. | |
| 2015/0286072 A1* | 10/2015 | Clarke | G02C 7/046 |
| | | | 351/159.04 |
| 2016/0018671 A1* | 1/2016 | Waite | A61P 37/08 |
| | | | 351/159.04 |
| 2017/0131570 A1* | 5/2017 | Thompson | G02C 7/049 |
| 2017/0307778 A1* | 10/2017 | Tran | B29D 11/00134 |
| 2017/0307779 A1* | 10/2017 | Marullo | B29D 11/00048 |
| 2018/0169905 A1* | 6/2018 | Marullo | B29D 11/00134 |
| 2020/0347166 A1 | 11/2020 | Alli | |
| 2021/0292557 A1 | 9/2021 | Cheng et al. | |
| 2021/0292558 A1 | 9/2021 | Bassampour et al. | |

FOREIGN PATENT DOCUMENTS

| | | |
|---|---|---|
| JP | 2012509152 A | 4/2012 |
| JP | 2020521182 A | 7/2020 |
| JP | 2021073346 A | 5/2021 |
| WO | 2010059764 A1 | 5/2010 |
| WO | 2013118177 A1 | 8/2013 |
| WO | 2017103790 A1 | 6/2017 |
| WO | 2018224975 A1 | 12/2018 |

* cited by examiner

DIFFRACTIVE CONTACT LENSES

This application claims the benefit under 35 USC § 119(e) of U.S. provisional application No. 63/210,193 filed 14 Jun. 2021, incorporated by reference in its entirety.

The present invention relates to an embedded silicone hydrogel contact lens having an embedded insert that comprises a diffractive structure disposed on one of the front and back surface of the insert for providing a diffractive power and to a method for making such a diffractive contact lens.

BACKGROUND OF THE INVENTION

Presbyopia is a well-known disorder in which the eye loses its ability to focus at close distance, affecting more than 2 billion patients worldwide. Extensive research efforts have been contributed to develop multifocal ophthalmic lenses (intraocular lenses or contact lenses) for correcting presbyopia. One of extensive research areas is the development of multifocal diffractive ophthalmic lenses. See, for example, U.S. Pat. Nos. 4,210,391, 4,338,005, 4,340,283, 4,637,697, 4,641,934, 4,642,112, 4,655,565, 4,830,481, 4,881,804, 4,881,805, 4,936,666, 4,995,714, 4,995,715, 5,054,905, 5,056,908, 5,076,684, 5,100,226, 5,104,212, 5,114,220, 5,116,111, 5,117,306, 5,120,120, 5,121,979, 5,121,980, 5,229,797, 5,748,282, 5,760,871, 5,982,543, 6,120,148, 6,364,483, 6,536,899, 6,951,391, 6,957,891, 7,025,456, 7,073,906, 7,093,938, 7,156,516, 7,188,949, 7,232,218, 7,891,810, 8,038,293, 8,128,222, 8,142,016, 8,382,281, 8,480,228, 8,556,416, 8,573,775, 8,678,583, 8,755,117, 9,033,494, 9,310,624, 9,320,594, 9,370,416, 10,197,815, 10,209,533, 10,426,599, 10,463,474, 10,524, 899, 10,675,146, 10,725,320, 10,932,901, and 10,945,834. Currently, multifocal diffractive intraocular lenses are commercially available for correcting presbyopia.

However, multifocal diffractive contact lenses are still not commercially available for correcting presbyopia (see, Perez-Prados, et al., "Soft Multifocal Simultaneous Image Contact Lenses: Review", Clin. Exp. Optom. 2017, 100: 107-127) probably due to some issues uniquely associated with contact lenses. For example, the standard lens materials have a refractive index of about 1.42 or less, i.e., about 0.04 higher than the refractive index of tear film. With such a small difference in refractive index, a higher diffraction grating height needs to be created on one of the anterior and posterior surface of a contact lens. But, contact lenses require smooth anterior and posterior surfaces for wearing comfort. Such a diffraction grating likely causes discomfort to a patient.

Therefore, there is a need for multifocal diffractive contact lenses.

SUMMARY OF THE INVENTION

The present invention, in one aspect, provides an embedded silicone hydrogel contact lens, comprising a silicone hydrogel bulk material and an insert embedded therein, wherein the insert is made of a crosslinked polymeric material having a first refractive index, wherein the silicone hydrogel bulk material has a second refractive index, wherein the first refractive index is at least 0.07 higher than the second refractive index, wherein the insert has a front curve surface, an opposite back curve surface and a diameter of less than 13.0 mm, wherein the insert is located in a central portion of the embedded hydrogel contact lens and comprises a diffractive structure disposed on one of the front and back curve surfaces for providing a diffractive power that contributes to the overall optical power of the contact lens, wherein the diffractive structure is buried inside the silicone hydrogel bulk material, wherein the embedded silicone hydrogel contact lens is not susceptible to delamination as demonstrated by being free of bubble when being inspected under microscopy at interfaces between the insert and the bulk material within the embedded hydrogel contact lens after being autoclaved in a packaging solution in a sealed package for about 45 minutes at 121° C., wherein the packaging solution is a phosphate buffered saline having a pH of 7.1±0.2.

In another aspect, the invention provides a method for producing an embedded silicone hydrogel contact lens having diffractive insert therein of the invention.

The present invention provides the foregoing and other features, and the advantages of the invention will become further apparent from the following detailed description of the presently preferred embodiments, read in conjunction with the accompanying figures. The detailed description and figures are merely illustrative of the invention and do not limit the scope of the invention, which is defined by the appended claims and equivalents thereof.

DESCRIPTION OF PREFERRED EMBODIMENTS

Figure 1:
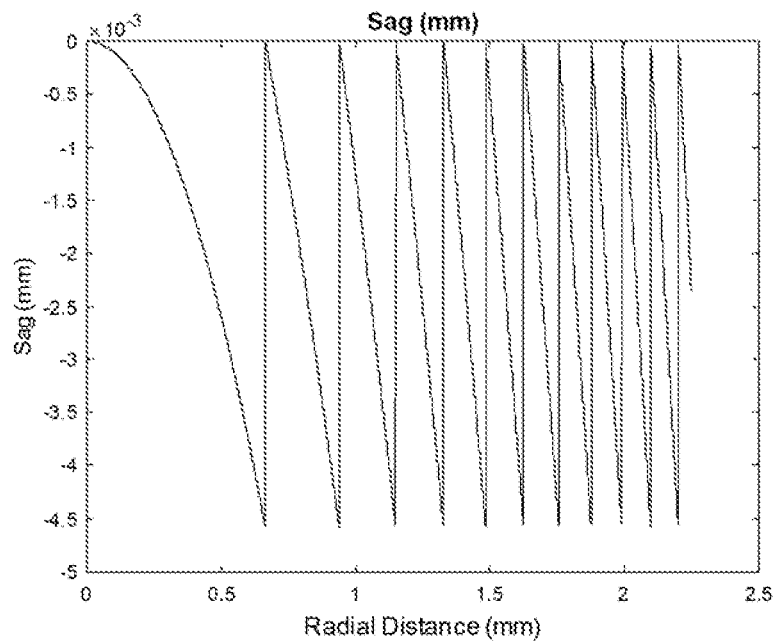
FIG. 1 shows a simulated diffractive profile disposed on the back (or front) curve surface of an insert with a RI of 1.55 that is embedded in a silicone hydrogel material having a RI of 1.43 for an added power of +2.5 D.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A "silicone hydrogel" or "SiHy" interchangeably refers to a silicone-containing hydrogel comprising repeating units of at least one silicone-containing monomer and/or silicone-containing vinylic crosslinker and repeating units of at least hydrophilic vinylic monomer.

A siloxane, which often also described as a silicone, refers to a molecule having at least one moiety of —Si—O—Si— where each Si atom carries two organic groups as substituents.

As used in this application, the term "non-silicone hydrogel" refers to a hydrogel that is theoretically free of silicon.

An "embedded hydrogel contact lens" refers a hydrogel contact lens comprising at least one insert which is embedded within the bulk hydrogel material of the embedded hydrogel contact lens to an extend that at most one of the front and back curve surfaces of the insert can be exposed fully or partially. It is understood that the material of the insert is different from the bulk hydrogel material of the embedded hydrogel contact lens.

An "insert" refers to any 3-dimensional article which has a dimension of at least 5 microns but is smaller in dimension sufficient to be embedded in the bulk material of an embedded hydrogel contact lens and which is made of a material (preferably a non-hydrogel material) that is different from the bulk hydrogel material.

In accordance with the invention, a non-hydrogel material can be any material that can absorb less than 10% (preferably about 7.5% or less, more preferably about 5% or less, even more preferably about 2.5% or less) by weight of water when being fully hydrated.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.5% by weight at room temperature (i.e., a temperature of about 21° C. to about 27° C.).

The term "insoluble", in reference to a compound or material in a solvent, means that the compound or material can be dissolved in the solvent to give a solution with a concentration of less than 0.01% by weight at room temperature (as defined above).

The term "ethylenically unsaturated group" is employed herein in a broad sense and is intended to encompass any groups containing at least one >C═CH$_2$ group. Exemplary ethylenically unsaturated groups include without limitation (meth)acryloyl

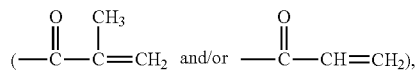

allyl, vinyl, styrenyl, or other C═C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

An "acrylic monomer" refers to a vinylic monomer having one sole (meth)acryloyl group. Examples of acrylic monomers includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

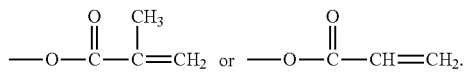

An "(meth)acrylamido monomer" refers to a vinylic monomer having one sole group of

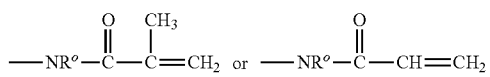

in which $R^o$ is H or $C_1$-$C_4$ alkyl.

The "aryl vinylic monomer" or "aryl-containing vinylic monomer" interchangeably refers to a vinylic monomer having at least one aromatic ring.

The term "aryl acrylic monomer" or "aryl-containing acrylic monomer" interchangeably refers to an acrylic monomer having at least one aromatic ring.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH═CH$_2$) that is directly attached to the nitrogen atom of the amide group.

The term "ene group" refers to a monovalent radical of CH$_2$═CH— or CH$_2$═CCH$_3$— that is not covalently attached to an oxygen or nitrogen atom or a carbonyl group.

An "ene monomer" refers to a vinylic monomer having one sole ene group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "aryl vinylic crosslinker" or "aryl-containing vinylic crosslinker" interchangeably refers to a vinylic crosslinker having at least one aromatic ring.

An "acrylic crosslinker" refers to a vinylic crosslinker having at least two (meth)acryloyl groups.

An "aryl acrylic crosslinker" or "aryl-containing acrylic crosslinker" interchangeably refers to a acrylic crosslinker having at least one aromatic ring.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

A "silicone-containing vinylic monomer or crosslinker" or a "siloxane-containing vinylic monomer or crosslinker" interchangeably refers to a vinylic monomer or crosslinker having at least one moiety of —Si—O—Si— where each Si atom carries at least two substituents (organic groups).

A "polysiloxane segment" or "polydiorganosiloxane segment" interchangeably refers to a polymer chain segment (i.e., a divalent radical) of

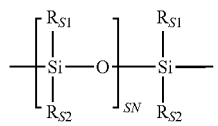

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma1}$—$OR^o$ (in which alk is $C_1$-$C_6$ alkylene diradical, $R^o$ is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of ~OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl; and an organic radical having up to 45 carbon atoms.

A "polydiorganosiloxane vinylic crosslinker" or polysiloxane vinylic crosslinker" interchangeably refers to a compound comprising at least one polysiloxane segment and at least two ethylenically-unsaturated groups.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatochraphy) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectrometry); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

The term "terminal ethylenically-unsaturated group" refers to one ethylenically-unsaturated group at one of the two ends of the main chain (or backbone) of an organic compound as known to a person skilled in the art.

A "blending vinylic monomer" refers to a vinylic monomer capable of dissolving both hydrophilic and hydrophobic components of a polymerizable composition to form a solution.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

"Post-curing surface treatment", in reference to a silicone hydrogel bulk material or a SiHy contact lens, means a surface treatment process that is performed after the silicone hydrogel bulk material or the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a silicone hydrogel (SiHy) contact lens or a SiHy lens bulk material as well known to a person skilled in the art.

The intrinsic "oxygen permeability", $Dk_t$, of a material is the rate at which oxygen will pass through a material.

Oxygen permeability is conventionally expressed in units of barrers, where "barrer" is defined as [(cm³ oxygen)(mm)/(cm²)(sec)(mm Hg)]×10⁻¹⁰.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as [(cm³ oxygen)/(cm²)(sec)(mm Hg)]×10⁻⁹.

The "ion permeability" through a lens correlates with the Ionoflux Diffusion Coefficient. The Ionoflux Diffusion Coefficient, D (in units of [mm²/min]), is determined by applying Fick's law as follows:

$$D=-n'/(A \times dc/dx)$$

where n'=rate of ion transport [mol/min]; A=area of lens exposed [mm²]; dc=concentration difference [mol/L]; dx=thickness of lens [mm].

The term "modulus" or "elastic modulus" in reference to a contact lens or a material means the tensile modulus or Young's modulus which is a measure of the stiffness of a contact lens or a material. The modulus can be measured according to the procedures described in Example 1.

An "unprocessed state" refers to an insert or contact lens which is obtained by cast-molding of a polymerizable composition in a mold and has not been subjected to extraction and/or hydration post-molding processes (i.e., having not been in contact with water or any organic solvent or any liquid after molding).

A "male mold half" or "base curve mold half" interchangeably refers to a mold half having a molding surface that is a substantially convex surface and that defines the posterior surface of a contact lens or an insert.

A "female mold half" or "front curve mold half" interchangeably refers to a mold half having a molding surface that is a substantially concave surface and that defines the anterior surface of a contact lens or an insert.

The term "anterior surface", "front surface", "front curve surface" or "FC surface" in reference to a contact lens or an insert, as used in this application, interchangeably means a surface of the contact lens or insert that faces away from the eye during wear. The anterior surface (FC surface) is convex.

The "posterior surface", "back surface", "base curve surface" or "BC surface" in reference to a contact lens or insert, as used in this application, interchangeably means a surface of the contact lens or insert that faces towards the eye during wear. The posterior surface (BC surface) is concave.

The term "diameter" in reference to a contact lens or an insert, as used in this application, means the width of the contact lens or the insert from edge to edge.

In general, the invention is directed to a delamination-resistant, diffractive contact lens having an insert embedded in a silicone hydrogel bulk material, wherein the insert is made of a crosslinked polymeric material having a refractive index higher than that of the silicone hydrogel bulk material by at least 0.07 and comprises a diffractive structure disposed on one of the front and back curve surfaces of the insert for providing a diffractive power that contributes to the overall optical power of the contact lens. This invention is partly based on the discovery that such inserts having a relatively-high oxygen permeability and a relatively high refractive index (≥1.49) can be prepared from a polymerizable composition comprising at least about 50% by mole of one or more acrylic monomers and/or crosslinkers and at least one polymerizable component selected from the group consisting of a silicone-containing vinylic monomer, an aryl vinylic monomer, an aryl silicone-containing vinylic monomer, a polysiloxane vinylic crosslinker comprising siloxane units each having at least one aryl-containing substituent. With a relatively-high oxygen permeability, such inserts would have minimized adverse effects on the oxygen permeability of the contact lens and consequently on the ocular health. With a relatively-high refractive index, the diffractive structure, which is essentially a diffraction grating and disposed on one of the front and back curve surfaces of each inserts, can have a reduced diffraction grating height (e.g., ≤5 μm). This invention is also partly based on the discovery that delamination-resistant embedded silicone hydrogel contact lens can be obtained by encapsulating completely or partially an insert comprising at least 50% by mole of repeating units of one or more acrylic monomers and/or crosslinker within a silicone hydrogel bulk material comprising repeating units of at least one silicone-containing vinylic crosslinker and/or monomer having H-bond donors.

There are some potential unique features associated with a delamination-resistant, diffractive contact lens. First, the diffractive structure is fully embedded in a silicone hydrogel bulk material. By not in contact with cornea or any ocular surface, the wearing comfort can be increased while the risks of adverse event can be decreased. Further, the vision stability due to variation in tear film can be reduced. In addition, diffraction grating with a reduced grating height can be more easily manufactured, e.g., by cast molding.

The present invention, in one aspect, provides an embedded silicone hydrogel contact lens, comprising a silicone hydrogel bulk material and an insert embedded therein, wherein the insert is made of a crosslinked polymeric material having a first refractive index, wherein the silicone hydrogel bulk material has a second refractive index, wherein the first refractive index is at least 0.07 (preferably at least 0.08, more preferably at least 0.09, even more preferably at least 0.10) higher than the second refractive index, wherein the insert has a front curve surface, an opposite back curve surface and a diameter of less than 13.0 mm, wherein the insert is located in a central portion of the embedded hydrogel contact lens and comprises a diffractive structure disposed on one of the front and back curve surfaces for providing a diffractive power that contributes to the overall optical power of the contact lens, wherein the diffractive structure is buried inside the silicone hydrogel bulk material, wherein the embedded silicone hydrogel contact lens is not susceptible to delamination as demonstrated by being free of bubble when being inspected under microscopy at interfaces between the insert and the silicone hydrogel bulk material within the embedded silicone hydrogel contact lens after being autoclaved in a packaging solution in a sealed package for about 45 minutes at 121° C., wherein the packaging solution is a phosphate buffered saline having a pH of 7.1±0.2.

The inspection of an embedded silicone hydrogel contact lens under microscopy for delamination can be carried out according any method known to a person skilled in the art. Preferably, it is carried according to the procedures described in Example 1 of this application.

In accordance with the invention, a diffractive structure is essentially a transmission diffraction grating. As known to a person skilled in the art, a transmission diffraction grating is typically comprised of a plurality of repetitive ridges and/or grooves regularly or periodically spaced and arranged in concentrically rings or zones—annular zones (i.e., echelettes) at a respective surface of a lens (i.e., an insert in this application). The periodic spacing or pitch of the ridges and/or grooves substantially determines the points of destructive and constructive interference at the optical axis of the lens. The shape and height of the ridges and/or grooves control the amount of incident light that is provided at a point of constructive interference by diffraction. The points of constructive interference are generally called diffraction orders or focal points.

The diffractive power is related to the properties of these zones, for instance their number, shape, size and position. Currently used echelettes may typically be defined by a primary zone, a secondary zone between the primary zone and a primary zone of an adjacent echelette, and an echelette geometry. The echelette geometry includes inner and outer diameters and a shaped or sloped profile. Secondary zones may describe the situation where the theoretical primary zone is a discontinuous function, leading to discrete steps in the profile height. Secondary zones may be introduced to solve the manufacturing issue of making sharp corner in a surface, and/or to reduce possible light scatter from sharp corners. The overall profile may be characterized by an echelette height or step height between adjacent echelettes. The relative radial spacing of the echelettes largely determine the power(s) of the lens and the step height of the secondary zones largely determines the light distribution between the different add powers. Together, these echelettes define a diffractive profile, often saw-toothed or stepped, on one of the surfaces of the lens.

The diffractive profile ($Z_{diff}$) (or so-called sag profile) can be given by Equation 1

$$Z_{diff} = \frac{m\lambda\varphi(x)}{RI_2 - RI_1} x^2 \quad (1)$$

in which m is the diffraction order (typically 0 for the distance focus and 1 for the ADD order), λ is the design wavelength (typically 550 nm), x is radial position (i.e., the radial distance from the center), and φ(x) is a phase function in the radial x direction.

The radial position x of the diffractive transitions is a function of the diffractive optical power to be added to the system or Add power and the wavelength:

$$\text{Zone } (i) = \sqrt{\frac{2i\lambda}{\text{Add}}} \quad (2)$$

And the height of the diffractive transition is given by:

$$\text{Height } (i) = \left| \frac{m\lambda}{RI_2 - RI_1} \right| \quad (3)$$

It is understood that any phase function known to a person skilled in the art can be used in creating a desired diffractive profile. Exemplary phase functions can be a modulo 2pi kinoform design which would function as a Fresnel lens, an apodized bifocal lens design similar to ReSTOR or a Quadrafocal design similar to PanOptix which would result in a trifocal lens.

Figure 2:
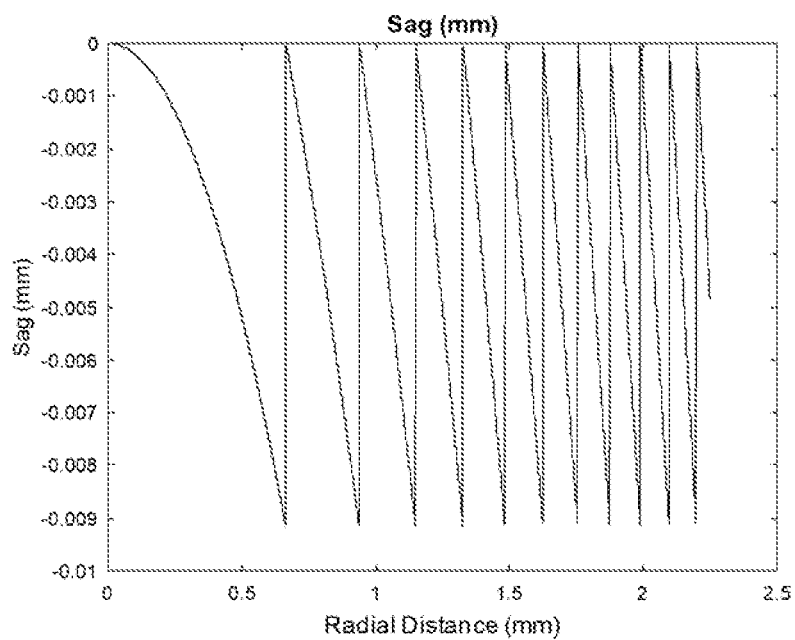
FIG. 2 shows a simulated diffractive profile disposed on the back (or front) curve surface of an insert with a RI of 1.47 that is embedded in a silicone hydrogel material having a RI of 1.43 for an added power of +2.5 D.

FIG. 1 illustrates a diffractive profile which can be created on one of the front and back curved surfaces of an insert having a refractive index (RI) that is 0.12 higher than the silicone bulk material encapsulating the insert, using a phase function of $$\varphi(x) = \left( \frac{const * x^2}{2} - m \right)$$

in which const=4.5. Such a diffractive profile would have a relatively small diffractive grating height, but still could provide an added power of +2.5 D. However, if the difference in RI between the insert material and the bulk SiHy material would be decreased to 0.06, a diffractive grating with a relatively larger diffractive grating height would be required to be created on the inserts (FIG. 2) for imparting an added power of +2.5 D.

In accordance with the invention, any diffractive structure can be disposed on one of the front and back curve surface of an insert of the invention, so long as the diffractive structure is completely buried inside the silicone hydrogel bulk material. The diffractive structure can be created (disposed) by cutting one of the front and back curve surfaces of a preformed insert with a lath or a laser according to a design for providing a desired diffractive power as known to a person skilled in the art. Alternatively, an insert with a diffractive structure on one of its front and back curve surface can be formed by cast-molding of a polymerizable composition using a mold for forming inserts having a diffractive structure thereon.

In one embodiment of the invention, the crosslinked polymeric material of the insert has a refractive index of at least about 1.47, preferably at least about 1.49, more preferably at least about 1.51, even more preferably at least about 1.53.

In another embodiment of the invention, the crosslinked polymeric material of the insert has an oxygen permeability of at least about 40 barrers, preferably at least about 60 barrers, more preferably at least about 80 barrers, even more preferably at least about 100 barrers.

In another preferred embodiment of the invention, the crosslinked polymeric material of the insert comprises at least 50% by mole of repeating units (acrylic repeating units) of one or more acrylic monomers and/or crosslinkers. It is understood that mole percentage of the acrylic repeating units can be calculated based on the mole percentage of all acrylic monomers and acrylic crosslinkers relative to all the polymerizable components in a polymerizable composition for forming the insert excluding non-reactive diluent.

In another preferred embodiment, the crosslinked polymeric material of the insert comprises repeating units of at least one aryl vinylic monomer and/or at least one aryl vinylic crosslinker.

Examples of aryl vinylic monomers include aryl acrylic monomers and aryl-containing ene monomers.

Examples of aryl acrylic monomers include without limitation 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl) ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)

ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate; or combinations thereof. The above listed aryl acrylic monomers can be obtained from commercial sources or alternatively prepared according to methods known in the art.

Examples of preferred aryl-containing ene monomers include without limitation styrene, 2,5-dimethylstyrene, 2-(trifluoromethyl)styrene, 2-chlorostyrene, 3,4-dimethoxystyrene, 3-chlorostyrene, 3-bromostyrene, 3-vinylanisole, 3-methylstyrene, 4-bromostyrene, 4-tert-butylstyrene, p-styryltrimethoxysilane, styrylethyltrimethoxysilane, 2,3,4,5,6-pentafluorostyrene, 2,4-dimethylstyrene, 1-methoxy-4-vinylbenzene, 1-chloro-4-vinylbenzene, 1-methyl-4-vinylbenzene, 1-(chloromethyl)-4-vinylbenzene, 1-(bromomethyl)-4-vinylbenzene, 3-nitrostyrene, 1,2-vinyl phenyl benzene, 1,3-vinyl phenyl benzene, 1,4-vinyl phenyl benzene, 4-vinyl-1,1'-(4'-phenyl)biphenylene, 1-vinyl-4-(phenyloxy)benzene, 1-vinyl-3-(phenyloxy)benzene, 1-vinyl-2-(phenyloxy)benzene, 1-vinyl-4-(phenyl carbonyl)benzene, 1-vinyl-3-(phenylcarboxy)benzene, 1-vinyl-2-(phenoxycarbonyl)benzene, allyl phenyl ether, 2-biphenylylallyl ether, allyl 4-phenoxyphenyl ether, allyl 2,4,6-tribromophenyl ether, allyl phenyl carbonate, 1-allyloxy-2-trifluoromethylbenzene, allylbenzene, 1-phenyl-2-prop-2-enylbenzene, 4-phenyl-1-butene, 4-phenyl-1-butene-4-ol, 1-(4-methylphenyl)-3-buten-1-ol, 1-(4-chlorophenyl)-3-buten-1-ol, 4-allyltoluene, 1-allyl-4-fluorobenzene, 1-allyl-2-methylbenzene, 1-allyl-3-methylbenzene, 1-allyl-3-methylbenzene, 2-allylanisole, 4-allylanisole, 1-allyl-4-(trifluromethyl)benzene, allylpentafluorobenzene, 1-allyl-2-methoxybenzene, 4-allyl-1,2-dimethoxybenzene, 2-allylphenol, 2-allyl-6-methylphenol, 4-allyl-2-methoxyphenol, 2-allyloxyanisole, 4-allyl-2-methoxyphenyl acetate, 2-allyl-6-methoxyphenol, 1-allyl-2-bromobezene, alpha-vinylbenzyl alcohol, 1-phenyl-3-butene-1-one, allylbenzyl ether, (3-allyloxy)propyl)benzene, allyl phenylethyl ether, 1-benzyloxy-4-pentene, (1-allyloxy)ethyl)benzene, 1-phenylallyl ethyl ether, (2-methyl-2-(2-propenyloxy)propyl)benzene, ((5-hexenyloxy)methyl)benzene, 1-allyloxy-4-propoxybenzene, 1-phenoxy-4-(3-prop-2-enoxypropoxy)benzene, 6-(4'-Hydroxyphenoxy)-1-Hexene, 4-but-3-enoxyphenol, 1-allyloxy-4-butoxybenzene, 1-allyloxy-4-ethoxybenzene, 1-allyl-4-benzyloxybenzene, 1-allyl-4-(phenoxy)benzene, 1-allyl-3-(phenoxy)benzene, 1-allyl-2-(phenoxy)benzene, 1-allyl-4-(phenyl carbonyl)benzene, 1-allyl-3-(phenyl carboxy)benzene, 1-allyl-2-(phenoxycarbonyl)benzene, 1,2-allyl phenyl benzene, 1,3-allyl phenyl benzene, 1,4-allyl phenyl benzene, 4-vinyl-1,1'-(4'-phenyl)biphenylene, 1-allyl-4-(phenyloxy)benzene, 1-allyl-3-(phenyloxy)benzene, 1-allyl-2-(phenyloxy)benzene, 1-allyl-4-(phenyl carbonyl)benzene, 1-allyl-3-(phenyl carboxy)benzene, and 1-allyl-2-(phenoxycarbonyl)benzene, 1-vinyl naphthylene, 2-vinyl naphthylene, 1-allyl naphthylene, 2-allyl naphthalene, allyl-2-naphthyl ether, 2-(2-methylprop-2-enyl)naphthalene, 2-prop-2-enylnaphthalene, 4-(2-naphthyl)-1-butene, 1-(3-butenyl)naphthalene, 1-allyl naphthalene, 2-allyl naphthalene, 1-allyl-4-napthyl naphthalene, 2-(allyloxy)-1-bromonaphthalene, 2-bromo-6-allyloxynaphthalene, 1,2-vinyl(1-naphthyl)benzene, 1,2-vinyl(2-naphthyl)benzene, 1,3-vinyl(1-naphthyl)benzene, 1,3-vinyl(2-naphthyl)benzene, 1,4-vinyl(1-naphthyl)benzene, 1,4-vinyl(2-naphthyl)benzene, 1-naphthyl-4-vinyl naphthalene, 1-allyl naphthalene, 2-allyl naphthalene, 1,2-allyl(1-naphthyl) benzene, 1,2-allyl(2-naphthyl)benzene, 1,3-allyl(1-naphthyl)benzene, 1,3-allyl(2-naphthyl)benzene, 1,4-allyl(1-naphthyl)benzene, 1,4-allyl(2-naphthyl)benzene, 1-allyl-4-napthyl naphthalene, 1-vinyl anthracene, 2-vinyl anthracene, 9-vinyl anthracene, 1-allyl anthracene, 2-allyl anthracene, 9-allyl anthracene, 9-pent-4-enylanthracene, 9-allyl-1,2,3,4-tetrachloroanthracene, 1-vinyl phenanthrene, 2-vinyl phenanthrene, 3-vinyl phenanthrene, 4-vinyl phenanthrene, 9-vinyl phenanthrene, 1-allyl phenanthrene, 2-allyl phenanthrene, 3-allyl phenanthrene, 4-allyl phenanthrene, 9-allyl phenanthrene, and combinations thereof.

Examples of aryl vinylic crosslinkers include without limitation divinylbenzene, 2-methyl-1,4-divinylbenzene, bis (4-vinylphenyl)methane, 1,2-bis(4-vinylphenyl)ethane, 1,4-diisopropenylbenzene, 1,2-bis(4-vinylphenyl)-1,2-ethanediol, 1,3-bis-methacryloyloxy-benzene, 1,4-phenylene dimethacrylate, bisphenol A dimethacrylate, bisphenol A glycerolate dimethacrylate, 2,5-bis{[2-(methacryloyloxy)ethoxy]carbonyl}terephthalic acid, 4-(methacryloyloxy)styrene, 2-[2-(benzyloxy)ethoxy]ethyl acrylate; 2-[2-(benzyloxy)ethoxy]ethyl methacrylate, and combinations thereof.

In a preferred embodiment, the crosslinked polymeric material of the insert comprises repeating units of a high RI polydiorganosiloxane vinylic crosslinker that comprises: (1) a polydiorganosiloxane segment comprising aryl-containing siloxane units each having an organic substituent having up to 45 carbon atoms and at least one aryl moiety (preferably linked to Si atom through a linker having at least 2, preferably 3 carbon atoms); and (2) ethylenically-unsaturated groups, preferably (meth)acryloyl groups.

In a preferred embodiment, the polydiorganosiloxane segment of the high RI polydiorganosiloxane vinylic crosslinker comprises at least 30% by mole (preferably at least 40% by mole, more preferably at least 50% by mole, even more preferably at least 60% by mole, particularly preferable at least 70% by mole) of the aryl-containing siloxane units.

In another preferred embodiment, the high RI polydiorganosiloxane vinylic crosslinker can have a number average molecular weight of at least 1000 Daltons (preferably from 1500 Daltons to 100000 Daltons, more preferably from 2000 to 80000 Daltons, even more preferably from 2500 to 60000 Dalton).

In accordance with the invention, the high RI polydiorganosiloxane vinylic crosslinker is preferably defined by formula (1)

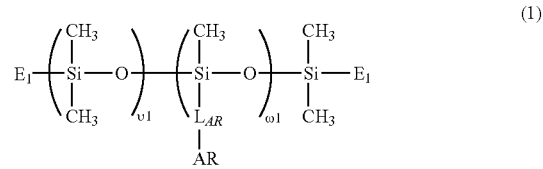

in which:
- υ1 is an integer of from 1 to 400 (preferably from 3 to 350, more preferably from 5 to 300, even more preferably from 10 to 250);
- ω1 is an integer of from 1 to 800 (preferably from 5 to 700, more preferably from 10 to 600, even more preferably from 15 to 500);
- $E_1$ is a monovalent radical of $$H_2C=\overset{R_0}{\underset{}{C}}-(O)_{a1}-\overset{O}{\underset{}{C}}-X_0-L_0-;$$

- $R_0$ is hydrogen or methyl;
- a1 is zero or 1;
- $X_0$ is O or $NR_{N1}$;
- $R_{N1}$ is hydrogen or a $C_1$-$C_6$ alkyl;
- $L_0$ is a $C_2$-$C_8$ alkylene divalent radical or a divalent radical of $$-L_0'-X_1-L_0''-, \quad -(C_2H_4O)_{q1}-L_0''-,$$
$$-(C_2H_4O)_{q1}-CONH-L_0''-, \quad \text{or}$$
$$-L_0'-NHCOO-(C_2H_4O)_{q1}-L_0''-;$$

- $L_0'$ is a $C_2$-$C_8$ alkylene divalent radical;
- $L_0''$ is $C_3$-$C_8$ alkylene divalent radical;
- $X_1$ is —O—, —$NR_{N1}$—, —NHCOO—, —OCONH—, —$CONR_{N1}$—, or —$NR_{N1}$CO—;
- q1 is an integer of 1 to 10;
- AR is an aryl radical;
- $L_{AR}$ is a divalent radical of $$-L_e-(X_2-L_x)_{a2}-X_{AR}-$$

- $L_e$ is a divalent radical of $$-CH_2-CH_2-, \quad -CH_2-CHR_0-R_1-,$$
$$-CH_2-CHR_0-R_1-O-,$$
$$-CH_2-CHR_0-R_1-O-R_2-,$$
$$-C_3H_6-O-R_2-,$$
$$-C_3H_6-O-R_2-O-, \quad -C_3H_6-(O-C_2H_4)_{q1}-,$$
$$-C_3H_6-(O-C_3H_6)_{q1}-,$$
$$-CH_2-CHR_0'-(R_1)_{a3}-\overset{OH}{\underset{}{CH}}-CH_2-,$$
$$-C_3H_6-O-CH_2-\overset{OH}{\underset{}{CH}}-CH_2-,$$
$$-C_2H_4-\underset{}{\bigcirc};$$

$$-C_2H_4-\overset{OH}{\underset{}{\bigcirc}}, \quad \text{or}$$
$$-C_2H_4-\underset{R_3}{\bigcirc}-;$$

- a2 is zero or 1 or 2;
- a3 is zero or 1;
- $R_1$ is a linear or branched $C_1$-$C_{10}$ alkylene divalent radical which is optionally substituted with $C_1$-$C_4$ alkoxy group, hydroxyl group, carboxyl group, amino group, oxo group, or combinations thereof;
- $R_2$ is a linear or branched $C_3$-$C_{10}$ alkylene divalent radical;
- $R_3$ is a direct bond or a linear or branched $C_1$-$C_4$ alkylene divalent radical;
- $X_{AR}$ and each $X_2$ independently of others are a covalent bond or a covalent linkage of

—O—, —S—, —N◯N—,

◯N—, ◯N—, —$NR_{N2}$—,

—NHCOO—, —OCONH—, —$NHCONR_{N2}$—,

—$NR_{NR}$CONH—, —NH—C(=O)—N◯N—,

—N◯N—C(=O)—NH—,

—NH—C(=O)—N◯,

◯N—C(=O)—NH—, —NH—C(=O)—N◯,

◯N—C(=O)—NH—, —$CONR_{N2}$—,

—$NR_{N2}$CO—, —C(=O)—N◯N—,

—N◯N—C(=O)—, —C(=O)—N◯,

◯N—C(=O)—, —C(=O)—N◯,

◯N—C(=O)—, —NHCOS—, —SCONH—,

—COO—, or —OCO—;

$R_{N2}$ is hydrogen, a linear or branched $C_1$-$C_6$ alkyl, cyclohexyl, cyclopentyl, a substituted or unsubstituted phenyl, or a substituted- or unsubstituted-phenyl-$C_1$-$C_6$ alkyl;

each $L_x$ independently is a linear or branched $C_1$-$C_{10}$ alkylene divalent radical which optionally has one or more hydroxyl or $C_1$-$C_4$-alkoxy groups or $C_1$-$C_4$-acylamino groups,

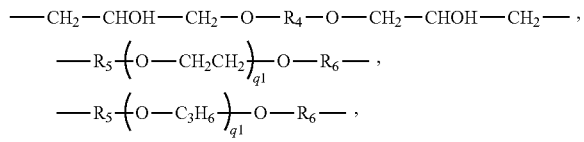

or a divalent radical which optionally has one or more hydroxyl or $C_1$-$C_4$-alkoxy groups and is obtained by removal of two hydrogen atoms from two different atoms of a hydrocarbon that has up to 20 carbon atoms and comprises at least one divalent radical selected from the group consisting of cycloalkylene radical, substituted cycloalkylene radical, phenylene radical, substituted phenylene radical, cycloheteroalkylene radical, and substituted cycloheteroalkylene radical; and each $R_4$, $R_5$ and $R_6$ independent of one another are a linear or branched $C_1$-$C_{10}$ alkylene divalent radical which has zero or one hydroxyl group.

In a preferred embodiment, in formula (1) a1 is zero and then $E_1$ is a monovalent radical of

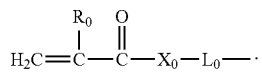

In another preferred embodiment, ω1/(υ1+ω1) is from about 0.30 to about 0.95 (preferably from about 0.40 to about 0.90, more preferably from about 0.50 to about 0.90, even more preferably from about 0.60 to about 0.85).

In another preferred embodiment, AR is a phenyl group, a substituted phenyl group, a naphthyl group, a substituted naphthyl group, an anthracenyl group, a substituted anthracenyl group, a phenanthryl group, or a substituted phenanthryl group.

In another preferred embodiment, AR is a monovalent radical of

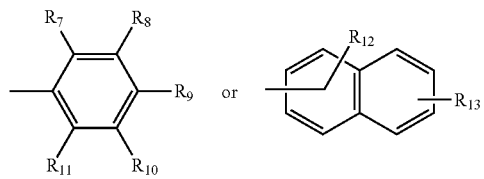

in which $R_7$, $R_8$, $R_9$, $R_{10}$, $R_{11}$, $R_{12}$, and $R_{13}$ independent of one another are H, Cl, Br, F, $CF_3$, $CCl_3$, $C_1$-$C_5$ alkyl, $C_1$-$C_5$ alkoxy, $C_2$-$C_5$ acyloxy, OH, phenyl, phenoxy, benzyloxy, phenylcarbonyl, phenoxycarbonyl, phenylcarboxy (phenylcarbonyloxy), or naphthyl.

A polydiorganosiloxane vinylic crosslinker of formula (1) can be prepared in a two-step as follows. In the first step, a hydrosiloxane-containing polydiorganosiloxane of formula (2) is obtained according to any known procedures.

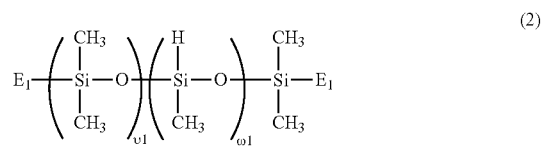

in which $E_1$, υ1, and ω1 are as defined above for formula (1). For example, a hydrosiloxane-containing polydiorganosiloxane of formula (2) can be prepared from polymerization of a mixture of octamethylcyclotetrasiloxane (D4) and 1,3,5,7-tetramethylcyclotetrasiloxane (H4) in presence of 1,3-bis(E1 group)-terminated tetramethyldisiloxane (e.g., 1,3-bis[3-(meth)acryloxypropyl] tetramethyldisiloxane, 1,3-bis [3-(meth)acrylamidopropyl]tetramethyldisiloxane, or the like) as a chain end block and in the presence of a catalyst. By controlling the molar ratio of D4 to H4, a desired value of υ1/ω1 can be obtained. It is understood that 1,3-bis(E1 group)-terminated tetramethyldisiloxane can be prepared from 1,3-bis(hydroxyalkyl)tetramethyldisloxane (e.g., 1,3-bis(hydroxypropyl)tetramethyldisloxane) or 1,3-bis(aminoalkyl)tetramethyldisloxane (e.g., 1,3-bis(aminopropyl)tetramethyldisloxane), e.g., by reacting one of them with a (meth)acryloyl chloride or a vinyl isocyanate (or isopropenyl isocyanate).

In the second step, a hydrosiloxane-containing polydiorganosiloxane of formula (2) can be reacted with an aryl-containing ene monomer (i.e., an ene monomer containing a phenyl group, a substituted phenyl group, a naphthyl group or a substituted naphthyl group) in a platinum-catalyzed hydrosilylation reaction as known to a person skilled in the art, to form a polydiorganosiloxane vinylic crosslinker of formula (1).

Any aryl-containing ene monomers can be used in preparing a polydiorganosiloxane vinylic crosslinker of formula (1), so long as the aryl-containing ene monomers comprise a phenyl group, a substituted phenyl group, a naphthyl group, a substituted naphthyl group, an anthracenyl group, a substituted anthracenyl group, a phenanthryl group, or a substituted phenanthryl group. Various aryl-containing ene monomers are described above and can be obtained from commercial suppliers or prepared according to known methods.

In another preferred embodiment, the crosslinked polymeric material of the insert comprises repeating units of at least one silicone-containing vinylic monomer (any one of those described below in this application) and/or at least one silicone-containing vinylic crosslinker (a high RI polysiloxane vinylic crosslinked described above and/or any one of those described below in this application).

In accordance with the invention, the crosslinked polymeric material of the insert can further comprises: (a) repeating units of at least one hydrophobic non-silicone vinylic monomer (any one of those described below in this application); (b) repeating units of at least one non-silicone vinylic crosslinkers other than aryl vinylic crosslinkers (any one of those described below in this application); (c) repeating units of at least one polymerizable material selected from the group consisting of a UV-absorbing vinylic monomer (any one of those described below in this application), a UV/high-energy-violet-light ("HEVL") absorbing vinylic monomer (any one of those described below in this application), a polymerizable photochromic compound (any one of those described below in this application), a polymerizable tinting agent (polymerizable dye) (any one known to a skilled person), and combinations thereof; or (d) combinations thereof.

In accordance with another embodiment of the invention, the silicone hydrogel bulk material comprises (1) repeating units of at least one silicone-containing polymerizable component that comprises at least 0.5 meq/g of H-bond donors and (2) repeating units of at least one hydrophilic vinylic monomer. The silicone-containing polymerizable component can be a first silicone-containing vinylic monomer, a first silicone-containing vinylic crosslinker, or both. It is believed that silicone-containing components of the silicone hydrogel bulk material can be located at the interface between the insert and the silicone hydrogel bulk material and hydrophobic-hydrophobic interactions and hydrogen bonds formed between the insert (H-bond acceptors such as acrylic groups) and the silicone hydrogel (H-bond donors) at the interface can be sufficiently strong to increase the delamination-resistance of the embedded silicone hydrogel contact lens.

In a preferred embodiment, the silicone-containing polymerizable component that comprises at least 0.5 meq/g of H-bond donors is a first silicone-containing vinylic monomer.

Any silicone-containing vinylic monomers can be used in the invention as the first silicone-containing vinylic monomers, so long as they comprises at least about 0.5 meq/g of H-bond donors. Examples of such silicone-containing vinylic monomers include without limitation [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl(meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl] (meth)acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-[tris(trimethylsiloxy)silyl]propylvinyl carbamate, 3-[tris(trimethylsiloxy)silyl] propyl allyl carbamate, α-(meth)acryloxy-terminated ω-$C_1$-$C_6$-hydroxyalkyl terminated polydimethylsiloxanes having a number average molecular weight of 2000 daltons or less, α-(meth)acrylamido-terminated ω-$C_1$-$C_6$-hydroxyalkyl terminated polydimethylsiloxanes having a number average molecular weight of 2000 daltons or less, α-(meth)acryloxy-2-hydroxypropyloxypropyl terminated ω-$C_1$-$C_4$-alkyl terminated polydimethylsiloxanes having a number average molecular weight of 2000 daltons or less, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxanes having a number average molecular weight of 2000 daltons or less, α-[3-(meth)acryloxy-propyloxy-2-hydroxypropyloxypropyl]-terminated ω-$C_1$-$C_4$-alkyl terminated polydimethylsiloxanes having a number average molecular weight of 2000 daltons or less, α-[3-(meth)acryloxyisopropyloxy-2-hydroxypropyloxypropyl]-terminated ω-$C_1$-$C_4$-alkyl terminated polydimethylsiloxane having a number average molecular weight of 2000 daltons or less, α-[3-(meth)acryloxybutyloxy-2-hydroxypropyloxypropyl]-terminated ω-$C_1$-$C_4$-alkyl terminated polydimethylsiloxanes having a number average molecular weight of 2000 daltons or less, α-[3-(meth)acryloxyethylamino-2-hydroxypropyloxypropyl]-terminated ω-$C_1$-$C_4$-alkyl terminated polydimethylsiloxanes having a number average molecular weight of 2000 daltons or less, α-[3-(meth)acryloxypropylamino-2-hydroxypropyloxypropyl]-terminated ω-$C_1$-$C_4$-alkyl terminated polydimethylsiloxanes having a number average molecular weight of 2000 daltons or less, α-[3-(meth)acryloxy-butylamino-2-hydroxypropyloxypropyl]-terminated ω-$C_1$-$C_4$-alkyl terminated polydimethylsiloxanes having a number average molecular weight of 2000 daltons or less, α-(meth)acryloxy(polyethylenoxy)-2-hydroxypropyloxypropyl]-terminated ω-$C_1$-$C_4$-alkyl terminated polydimethylsiloxanes having a number average molecular weight of 2000 daltons or less, α-[(meth)acryloxy-2-hydroxypropyloxy-ethoxypropyl]-terminated ω-$C_1$-$C_4$-alkyl terminated polydimethylsiloxanes having a number average molecular weight of 2000 daltons or less, α-[(meth)acryloxy-2-hydroxypropyl-N-ethylaminopropyl]-terminated ω-$C_1$-$C_4$-alkyl terminated polydimethylsiloxanes having a number average molecular weight of 2000 daltons or less, α-[(meth)acryloxy-2-hydroxypropyl-aminopropyl]-terminated ω-$C_1$-$C_4$-alkyl terminated polydimethylsiloxanes having a number average molecular weight of 2000 daltons or less, α-[(meth)acryloxy-2-hydroxypropyloxy-(polyethylenoxy)propyl]-terminated ω-$C_1$-$C_4$-alkyl terminated polydimethylsiloxanes having a number average molecular weight of 2000 daltons or less, α-(meth)acrylamidopropyloxypropyl terminated ω-$C_1$-$C_4$-alkyl terminated polydimethylsiloxanes having a number average molecular weight of 2000 daltons or less, α-[3-(meth)acrylamidoethoxy-2-hydroxypropyloxy-propyl]-terminated ω-$C_1$-$C_4$-alkyl polydimethylsiloxanes having a number average molecular weight of 2000 daltons or less, α-[3-(meth)acrylamidopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidoisopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidobutyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamido-2-hydroxypropyloxypropyl] terminated ω-$C_1$-$C_4$-alkyl polydimethylsiloxanes having a number average molecular weight of 2000 daltons or less, α-[3-[N-methyl-(meth)acrylamido]-2-hydroxypropyloxypropyl] terminated ω-$C_1$-$C_4$-alkyl terminated polydimethylsiloxanes having a number average molecular weight of 2000 daltons or less, N-(2,3-dihydroxypropane)-N'-(propyltetra(dimethylsiloxy)-dimethylbutylsilane) (meth)acrylamide, (meth)acrylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, and combinations thereof. Preferably, the first silicone-containing vinylic monomer is one of those described above and comprising one or more hydroxyl groups.

In another preferred embodiment, the silicone-containing polymerizable component that comprises at least 0.5 meq/g of H-bond donors is a first polysiloxane vinylic crosslinker.

In accordance with the invention, any polysiloxane vinylic crosslinkes can be used in the invention as the first polysiloxane vinylic crosslinkers, so long as they comprises at least about 0.5 meq/g of H-bond donors. Examples of such polysiloxane vinylic crosslinkers are di-(meth)acrylamido-terminated polysiloxane vinylic crosslinkers having a number average molecular weight of 4000 Daltons or less, α,ω-bis[3-(meth)acryloxy-2-hydroxypropyloxypropyl]-terminated polydimethylsiloxanes having a number average molecular weight of 4000 Daltons or less, α,ω-bis[3-(meth)acryloxyethoxy-2-hydroxypropyloxypropyl]-terminated polydimethylsiloxanes having a number average molecular weight of 4000 Daltons or less, α,ω-bis[3-(meth)acryloxypropyloxy-2-hydroxypropyloxypropyl]-terminated polydimethylsiloxanes having a number average molecular weight of 4000 Daltons or less, α,ω-bis[3-(meth)acryloxy-isopropyloxy-2-hydroxypropyloxypropyl]-terminated polydimethylsiloxanes having a number average molecular weight of 4000 Daltons or less, α,ω-bis[3-(meth)acryloxybutyloxy-2-hydroxypropyloxypropyl]-terminated polydimethylsiloxanes having a number average molecular weight of 4000 Daltons or less, α,ω-bis[3-(meth)acrylamidoethoxy-2-hydroxypropyloxypropyl]-terminated polydimethylsiloxanes having a number average molecular weight of 8000 Daltons or less, α,ω-bis[3-(meth)acrylamidopropyloxy-2-hydroxypropyloxypropyl]-terminated polydimethylsiloxanes having a number average molecular weight of 8000 Daltons or less, α,ω-bis[3-(meth)acrylamidoisopropyloxy-2-hydroxypropyloxypropyl]-terminated polydimethylsiloxanes having a number average molecular weight of 4000 Daltons or less, α,ω-bis[3-(meth)acrylamidobutyloxy-2-hydroxypropyloxypropyl]-terminated polydimethylsiloxanes having a number average molecular weight of 8000 Daltons or less, α,ω-bis[3-(meth)acryloxyethylamino-2-hydroxypropyloxypropyl]-terminated polydimethylsiloxanes having a number average molecular weight of 8000 Daltons or less, α,ω-bis[3-(meth)acryloxypropylamino-2-hydroxypropyloxypropyl]-terminated polydimethylsiloxanes having a number average molecular weight of 8000 Daltons or less, α,ω-bis[3-(meth)acryloxybutylamino-2-hydroxypropyloxypropyl]-terminated polydimethylsiloxanes having a number average molecular weight of 8000 Daltons or less, α,ω-bis[(meth)acrylamidoethylamino-2-hydroxypropyloxy-propyl]-terminated polydimethylsiloxanes having a number average molecular weight of 12000 Daltons or less, α,ω-bis[3-(meth)acrylamidopropylamino-2-hydroxypropyloxypropyl]-terminated polydimethylsiloxanes having a number average molecular weight of 4000 Daltons or less, α,ω-bis[3-(meth)acrylamide-butylamino-2-hydroxypropyloxypropyl]-terminated polydimethylsiloxanes having a number average molecular weight of 4000 Daltons or less, α,ω-bis[(meth)acryloxy-2-hydroxypropyloxy-ethoxypropyl]-terminated polydimethylsiloxanes having a number average molecular weight of 4000 Daltons or less, α,ω-bis[(meth)acryloxy-2-hydroxypropyl-N-ethylaminopropyl]-terminated polydimethylsiloxanes having a number average molecular weight of 12000 Daltons or less, α,ω-bis[(meth)acryloxy-2-hydroxypropyl-aminopropyl]-polydimethylsiloxanes having a number average molecular weight of 8000 Daltons or less, α,ω-bis[(meth)acryloxy-2-hydroxypropyloxy-(polyethylenoxy)propyl]-terminated polydimethylsiloxane having a number average molecular weight of 4000 Daltons or less, α,ω-bis[(meth)acryloxyethyl-amino-carbonyloxy-ethoxypropyl]-terminated polydimethylsiloxanes having a number average molecular weight of 4000 Daltons or less, α,ω-bis[(meth)acryloxyethylamino-carbonyloxy-(polyethylenoxy)propyl]-terminated polydimethylsiloxanes having a number average molecular weight of 4000 Daltons or less, di-(meth)acryloyloxy-terminated or di-(meth)acrylamido-terminated chain-extended polysiloxane vinylic crosslinkers each of which comprises at least two polysiloxane segments and linkages between each pair of polysiloxane segments and between one (meth)acryloyloxy group and one polysiloxane segment and each linkage has at least one H-bond donor, a polysiloxane vinylic crosslinkers having dimethylsiloxane units and hydrophilized siloxane units each having one methyl substituent and one monovalent $C_4$-$C_{40}$ organic radical substituent having at least one H-bond donor (preferably 2 to 6 hydroxyl groups, such as a polysiloxane vinylic crosslinker of formula (G), which is described later in this application and can be prepared according to the procedures disclosed in U.S. patent Ser. No. 10/081,697), and combinations thereof. Preferably, the first polysiloxane vinylic crosslinker comprises at least two urethane linkages (—O—CO—NH—), at least two urea linkages (—NH—CO—NH—), at least two hydroxyl groups, or combinations thereof.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

Examples of alkyl (meth)acrylamides include without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)

ethyl (meth)acrylamide having a number average molecular weight of up to 1500, and combinations thereof.

Examples of carboxyl-containing acrylic monomers include without limitation 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

Examples of methylene-containing pyrrolidone monomers include without limitation 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

Examples of acrylic monomers having a $C_1$-$C_4$ alkoxyethoxy group include without limitation ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof.

Examples of vinyl ether monomers include without limitation ethylene glycol monovinyl ether, di(ethylene glycol) monovinyl ether, tri(ethylene glycol) monovinyl ether, tetra (ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly (ethylene glycol) methyl vinyl ether, and combinations thereof.

Examples of allyl ether monomers include without limitation ethylene glycol monoallyl ether, di(ethylene glycol) monoallyl ether, tri(ethylene glycol) monoallyl ether, tetra (ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly (ethylene glycol) methyl allyl ether, and combinations thereof.

Examples of phosphorylcholine-containing vinylic monomers include without limitation (meth)acryloyloxyethyl phosphorylcholine, (meth)acryloyloxypropyl phosphorylcholine, 4-((meth)acryloyloxy)butyl-2'-(trimethylammonio) ethylphosphate, 2-[(meth)acryloylamino]ethyl-2'-(trimethylammonio)-ethylphosphate, 3-[(meth)acryloylamino]-propyl-2'-(trimethylammonio)ethylphosphate, 4-[(meth) acryloylamino]butyl-2'-(trimethyl-ammonio) ethylphosphate, 5-((meth)acryloyloxy)pentyl-2'-(trimethylammonio)ethyl phosphate, 6-((meth)acryloyloxy) hexyl-2'-(trimethylammonio)-ethylphosphate, 2-((meth) acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy) butyl-2'-(trimethylammonio)ethylphosphate, 2-((meth) acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)ethylphosphate, 2-(vinylcarbonylamino)ethyl-2'-(trimethylammonio)ethylphosphate, 2-(allyloxycarbonylamino)-ethyl-2'-(trimethylammonio) ethyl phosphate, 2-(butenoyloxy)ethyl-2'-(trimethylammonio)-ethylphosphate, and combinations thereof.

In accordance with the invention, the silicone hydrogel bulk material can further comprise: repeating units of at least one second silicone-containing vinylic monomer (other than the first silicone-containing vinylic monomer) and/or a second polysiloxane vinylic crosslinker (other than the first polysiloxane vinylic crosslinker); repeating units of at least one hydrophobic non-silicone vinylic monomer; repeating units of at least one non-silicone vinylic crosslinkers (any one of those described below in this application); repeating units of at least one polymerizable material selected from the group consisting of a UV-absorbing vinylic monomer (any one of those described below in this application), a UV/high-energy-violet-light ("HEVL") absorbing vinylic monomer (any one of those described below in this application), a polymerizable photochromic compound (any one of those described below in this application), a polymerizable tinting agent (polymerizable dye) (any one known to a skilled person), and combinations thereof; or combinations thereof.

In accordance with the invention, a second silicone-containing vinylic monomer can be any known silicone-containing vinylic monomer other than the first silicone-containing vinylic monomer and can include or can be free of H-bond donor. Examples of preferred silicone-containing vinylic monomers include without limitation vinylic monomers each having a bis(trialkylsilyloxy)alkylsilyl group or a tris(trialkylsilyloxy)silyl group, polysiloxane vinylic monomers, 3-methacryloxypropylpentamethyldisiloxane, t-butyldimethyl-siloxyethyl vinyl carbonate, trimethylsilylethyl vinyl carbonate, and trimethylsilylmethyl vinyl carbonate, and combinations thereof. Polysiloxanes vinylic monomers can be obtained from commercial suppliers (e.g., Shin-Etsu, Gelest, etc.) or can be prepared according to procedures described in patents, e.g., U.S. Pat. Nos. 5,070,215, 6,166,236, 6,867,245, 8,415,405, 8,475,529, 8,614,261, and 9,217,813. Preferred silicone-containing vinylic monomers each having a bis(trialkylsilyloxy)alkylsilyl group or a tris(trialkylsilyloxy)silyl group can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

In accordance with the invention, a second silicone-containing vinylic crosslinker can be any known silicone-containing vinylic crosslinker other than the first silicone-containing vinylic crosslinker and can include or can be free of H-bond donor. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875; di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, which can be prepared according to the procedures disclosed in U.S. patent Ser. No. 10/081,697; vinylic crosslinkers each of which comprises one sole polydiorganosiloxane segment and two terminal (meth)acryloyl groups, which can be obtained from commercial suppliers, prepared by reacting glycidyl (meth)acrylate (meth)acryloyl chloride with a di-amino-terminated polydimethylsiloxane or a di-hydroxyl-terminated polydimethylsiloxane, prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide), prepared by reacting a carboxyl-containing acrylic monomer with di-amino-terminated polydimethylsiloxane in the presence of a coupling agent (a carbodiimide), or prepared by reacting a hydroxyl-containing acrylic monomer with a di-hydroxy-terminated polydisiloxane in the presence of a diisocyanate or di-epoxy coupling agent; chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10,301,451, and 10,465,047.

Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, etc.) fluorine-containing acrylic monomers (e.g., perfluorohexylethyl-thio-carbonyl-amino-ethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isobutyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth)acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-isopropyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, and combinations thereof.

Examples of preferred non-silicone vinylic crosslinkers (free of any aryl group) include without limitation: acrylic crosslinkers as described below, allyl methacrylate, allyl acrylate, triallyl isocyanurate, 2,4,6-triallyloxy-1,3,5-triazine, 1,2,4-trivinylcyclohexane, or combinations thereof.

Examples of acrylic crosslinking agents include without limitation ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5- tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9Cl) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred polymerizable photochromic compounds include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline) benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline)pyridobenzoxazines, polymerizable spiro(benzindoline)pyridobenzoxazines, polymerizable spiro(benzindoline)naphthoxazines, polymerizable spiro(indoline)-benzoxazines, polymerizable diarylethenes, and combinations thereof, as disclosed in U.S. Pat. Nos. 4,929,693, 5,166,345, 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In accordance with the invention, the silicone hydrogel bulk material of the embedded silicone hydrogel contact lens has an equilibrium water content (i.e., in fully hydrated state or when being fully hydrated) of from about 20% to about 70% (preferably from about 20% to about 65%, more preferably from about 25% to about 65%, even more preferably from about 30% to about 60%) by weight, an oxygen permeability of at least about 40 barrers (preferably at least about 60 barrers, more preferably at least about 80 barrers, more preferably at least about 100 barrers), and a modulus (i.e., Young's modulus) of about 1.5 MPa or less (preferably from about 0.2 MPa to about 1.2 MPa, more preferably from about 0.3 MPa to about 1.1 MPa, even more preferably from about 0.4 MPa to about 1.0 MPa).

In accordance with the invention, an insert or an embedded silicone hydrogel (SiHy) contact lens of the invention can be produced according to any lens manufacturing processes. A person skilled in the art knows very well how to make inserts or SiHy contact lenses. For example, inserts or embedded SiHy contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., an insert formulation or a SiHy lens formulation) typically is dispensed into molds and cured (i.e., polymerized and/or crosslinked) thermally or actinically in molds for making inserts or SiHy contact lenses.

Lens molds for making inserts or SiHy contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that an insert-forming or lens-forming cavity is formed between the first molding surface and the second molding surface. The molding surface of a mold half is the cavity-forming surface of the mold and in direct contact with the polymerizable composition.

Methods of manufacturing mold sections for cast-molding a contact lens or insert are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

Numerous silicone hydrogel lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be directly used as a lens-forming composition of the invention or can be used to prepare a lens-forming composition of the invention by adding a silicone-containing polymerizable component having at least 0.5 meq/g of H-bond donors.

A lens-forming composition or an insert-forming composition can be a solventless clear liquid prepared by mixing all polymerizable components (or materials), at least one free-radical initiator (thermal polymerization initiator or photoinitiator), and other necessary components (or materials) or a solution prepared by dissolving all of the desirable components (or materials) and at least one free-radical initiator in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction (any of those solvents as described later in this application).

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173@ and Darocur 2959@, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329. Preferably, a SiHy lens formulation for making a SiHy contact lenses comprises at least one photoinitiator which can be initiated by visible lights, such as, benzoylphosphine oxide photoinitiators, Germanium-based Norrish Type I photoinitiators, or combinations thereof.

A solventless lens SiHy lens formulation (silicone hydrogel lens-forming composition) typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, dimethylcyclopentane (various isomers), 2,2,4-trimethylpentane, and mixtures thereof.

In accordance with the invention, a polymerizable composition (insert formulation or SiHy lens formulation) can be introduced (dispensed) into a cavity formed by the male and female mold halves of a mold according to any known methods.

After the polymerizable composition is dispensed into the mold, it is polymerized to produce a SiHy contact lens. Crosslinking may be initiated thermally or actinically, as known to a person skilled in the art.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

Opening of the mold so that the molded insert or SiHy contact lens can be removed from the mold may take place in a manner known per se.

As an illustrative example, an embedded silicone hydrogel contact lens of the invention can be prepared as follows. A preformed insert having a diffractive structure on one of the front and back curve surfaces of the insert is placed in the central region of the molding surface of a female mold half (e.g., made of polypropylene) which preferably has three or more spikes distributed in a circle having a diameter sufficient to accommodate the preformed insert for fixing the position of the preformed insert on the molding surface. An additional amount of a SiHy lens formulation is dosed in the female mold half to immerse the preformed insert, a mold half (e.g., made of polypropylene) is then placed on top the female mold half, and the mold is closed securely to form a molding assembly. The SiHy lens formulation in the molding assembly then is thermally or actinically cured (polymerized) to form an embedded SiHy contact lens with the fully-embedded insert that comprises the diffractive structure.

Alternatively, a small amount of a first SiHy lens formulation is dispensed into a female mold half in its center area. Optionally but preferably, the first SiHy lens formulation is partially cured to increase its viscosity. Then, a preformed insert having a diffractive structure on one of the front and back curve surfaces of the insert is placed on top of and pressed into the partially-cured first SiHy lens formulation (or the un-cured first SiHy lens formulation) in the central region of the molding surface of the female mold half to hold the preformed insert in the desired position on the molding surface. If having not been partially cured, then the first SiHy lens formulation with the preformed insert in the female mold half is irradiated with a light to partially cure the first SiHy lens formulation. Next, an amount of a second SiHy lens formulation is dispensed in the female mold half to immerse the preformed insert, a mold half (e.g., made of polypropylene) is then placed on top the female mold half, and the mold is closed securely to form a molding assembly. The first and second SiHy lens formulations in the molding assembly are thermally or actinically cured (polymerized) to form an embedded SiHy contact lens with the fully-embedded insert that comprises the diffractive structure.

Another approach for making an embedded SiHy contact lens of the invention can be one illustrated below involving use of a set of three mold halves: one female mold half has a first molding surface defining the anterior surface of a contact lens to be molded; a first male mold half having a second molding surface defining the back curve surface including a diffractive structure disposed thereon of an insert to be molded; and a second male mold half having a third molding surface defining the posterior surface of the contact lens to be molded. The first male mold half and the female mold half are configured to receive each other such that an insert-molding cavity is formed between the first and second molding surface when being closed, whereas the second male mold half and the female mold half are configured to receive each other such that a lens-molding cavity is formed between the first and third molding surfaces when being closed. In production, an amount of an insert-forming composition is dosed on the central portion of the first molding surface of the female mold half and then mated and closed with the first male mold half to form a first molding assembly. The insert-forming composition in the insert-molding cavity of the first molding assembly is cured (thermally or actinically) to form a molded insert. Then, the first molding assembly is separated into the first male mold half and the female mold half with the molded insert adhered onto the central area of the first molding surface. A lens-forming composition is dose into the female mold half with the molded insert adhered thereon in an amount sufficient for filling the lens-molding cavity and then mated and closed with the second male mold half to form a second molding assembly. The lens-forming composition in the lens-molding cavity of the second molding assembly is cured (thermally or actinically) to form an embedded SiHy contact lens with the partially-embedded insert that comprises the diffractive structure.

Another similar approach for making an embedded SiHy contact lens of the invention can be one illustrated below involving use of a set of three mold halves: a first female mold half has a first molding surface defining the front curve surface including a diffractive structure disposed thereon of an insert to be molded; one male mold half having a second molding surface defining the posterior surface of a contact lens to be molded; and a second female mold half having a third molding surface defining the anterior surface of the contact lens to be molded. The first female mold half and the male mold half are configured to receive each other such that an insert-molding cavity is formed between the first and second molding surfaces when being closed, whereas the second female mold half and the male mold half are configured to receive each other such that a lens-molding cavity is formed between the second and third molding surfaces when being closed. In production, an amount of an insert-forming composition is dosed on the central portion of the first molding surface of the female mold half and then mated and closed with the male mold half to form a first molding assembly. The insert-forming composition in the insert-molding cavity of the first molding assembly is cured (thermally or actinically) to form a molded insert. Then, the first molding assembly is separated into the first female mold half and the male mold half with the molded insert adhered onto the central area of the second molding surface. A lens-forming composition is dose into the second female mold half and then mated and closed with the male mold half with the molded insert adhered thereto to form a second molding assembly. The lens-forming composition in the lens-molding cavity of the second molding assembly is cured (thermally or actinically) to form an embedded SiHy contact lens with the partially-embedded insert that comprises the diffractive structure.

The molded insert or embedded SiHy contact lenses can be subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

After extraction, embedded silicone hydrogel contact lens can be hydrated in water or an aqueous solution to replace the liquid extraction medium, according to any method known to a person skilled in the art.

The hydrated embedded silicone hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention.

Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. An embedded silicone hydrogel contact lens, comprising:
   a silicone hydrogel bulk material and an insert embedded therein,
   wherein the insert is made of a crosslinked polymeric material having a first refractive index, wherein the silicone hydrogel bulk material has a second refractive index, wherein the first refractive index is at least 0.07 higher than the second refractive index,
   wherein the insert has a front curve surface, an opposite back curve surface and a diameter of less than 13.0 mm, wherein the insert is located in a central portion of the embedded hydrogel contact lens and comprises a diffractive structure disposed on one of the front and back curve surfaces for providing a diffractive power that contributes to the overall optical power of the contact lens, wherein the diffractive structure is buried inside the silicone hydrogel bulk material,
   wherein the embedded silicone hydrogel contact lens is not susceptible to delamination as demonstrated by being free of bubble when being inspected under microscopy at interfaces between the insert and the silicone hydrogel bulk material within the embedded silicone hydrogel contact lens after being autoclaved in a packaging solution in a sealed package for about 45 minutes at 121° C., wherein the packaging solution is a phosphate buffered saline having a pH of 7.1±0.2.

2. The embedded silicone hydrogel contact lens of embodiment 1, wherein the first refractive index is at least 0.08 higher than the second refractive index.

3. The embedded silicone hydrogel contact lens of embodiment 1, wherein the first refractive index is at least 0.09 higher than the second refractive index.

4. The embedded silicone hydrogel contact lens of embodiment 1, wherein the first refractive index is at least 0.10 higher than the second refractive index.

5. The embedded silicone hydrogel contact lens of any one of embodiments 1 to 4, wherein, the crosslinked polymeric material of the insert has a refractive index of at least about 1.47.

6. The embedded silicone hydrogel contact lens of any one of embodiments 1 to 4, wherein the crosslinked polymeric material of the insert has a refractive index of at least about 1.49.

7. The embedded silicone hydrogel contact lens of any one of embodiments 1 to 4, wherein the crosslinked polymeric material of the insert has a refractive index of at least about 1.51.

8. The embedded silicone hydrogel contact lens of any one of embodiments 1 to 4, wherein the crosslinked polymeric material of the insert has a refractive index of at least about 1.53.

9. The embedded silicone hydrogel contact lens of any one of embodiments 1 to 8, wherein the crosslinked polymeric material of the insert has an oxygen permeability of at least about 40 barrers.

10. The embedded silicone hydrogel contact lens of any one of embodiments 1 to 8, wherein the crosslinked polymeric material of the insert has an oxygen permeability of at least about 60 barrers.

11. The embedded silicone hydrogel contact lens of any one of embodiments 1 to 8, wherein the crosslinked polymeric material of the insert has an oxygen permeability of at least about 80 barrers.

12. The embedded silicone hydrogel contact lens of any one of embodiments 1 to 8, wherein the crosslinked polymeric material of the insert has an oxygen permeability of at least about 100 barrers.

13. The embedded silicone hydrogel contact lens of any one of embodiments 1 to 12, wherein the crosslinked polymeric material of the insert comprises at least 50% by mole of repeating units (acrylic repeating units) of one or more acrylic monomers and/or crosslinkers.

14. The embedded silicone hydrogel contact lens of any one of embodiments 1 to 13, wherein the crosslinked polymeric material of the insert comprises repeating units of at least one aryl vinylic monomer.

15. The embedded silicone hydrogel contact lens of embodiment 14, wherein said at least one aryl vinylic monomer comprises: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate; or a combination thereof 16. The embedded silicone hydrogel contact lens of embodiment 14 or 15, wherein said at least one aryl vinylic monomer comprises: styrene, 2,5-dimethylstyrene, 2-(trifluoromethyl)styrene, 2-chlorostyrene, 3,4-dimethoxystyrene, 3-chlorostyrene, 3-bromostyrene, 3-vinylanisole, 3-methylstyrene, 4-bromostyrene, 4-tert-butylstyrene, p-styryltrimethoxysilane, styrylethyltrimethoxysilane, 2,3,4,5,6-pentanfluorostyrene, 2,4-dimethylstyrene, 1-methoxy-4-vinylbenzene, 1-chloro-4-vinylbenzene, 1-methyl-4-vinylbenzene, 1-(chloromethyl)-4-vinylbenzene, 1-(bromomethyl)-4-vinylbenzene, 3-nitrostyrene, 1,2-vinyl phenyl benzene, 1,3-vinyl phenyl benzene, 1,4-vinyl phenyl benzene, 4-vinyl-1,1'-(4'-phenyl)biphenylene, 1-vinyl-4-(phenyloxy)benzene, 1-vinyl-3-(phenyloxy)benzene, 1-vinyl-2-(phenyloxy)benzene, 1-vinyl-4-(phenyl carbonyl)benzene, 1-vinyl-3-(phenylcarboxy)benzene, 1-vinyl-2-(phenoxycarbonyl)benzene, allyl phenyl ether, 2-biphenylylallyl ether, allyl 4-phenoxyphenyl ether, allyl 2,4,6-tribromophenyl ether, allyl phenyl carbonate, 1-allyloxy-2-trifluoromethylbenzene, allylbenzene, 1-phenyl-2-prop-2-enylbenzene, 4-phenyl-1-butene, 4-phenyl-1-butene-4-ol, 1-(4-methylphenyl)-3-buten-1-ol, 1-(4-chlorophenyl)-3-buten-1-ol, 4-allyltoluene, 1-allyl-4-fluorobenzene, 1-allyl-2-methylbenzene, 1-allyl-3-methylbenzene, 1-allyl-3-methylbenzene, 2-allylanisole, 4-allylanisole, 1-allyl-4-(trifluromethyl)benzene, allylpentafluorobenzene, 1-allyl-2-methoxybenzene, 4-allyl-1,2-dimethoxybenzene, 2-allylphenol, 2-allyl-6-methylphenol, 4-allyl-2-methoxyphenol, 2-allyloxyanisole, 4-allyl-2-methoxyphenyl acetate, 2-allyl-6-methoxyphenol, 1-allyl-2-bromobezene, alpha-vinylbenzyl alcohol, 1-phenyl-3-butene-1-one, allylbenzyl ether, (3-allyloxy)propyl)benzene, allyl phenylethyl ether, 1-benzyloxy-4-pentene, (1-allyloxy)ethyl)benzene, 1-phenylallyl ethyl ether, (2-methyl-2-(2-propenyloxy)propyl)benzene, ((5-hexenyloxy)methyl)benzene, 1-allyloxy-4-propoxybenzene, 1-phenoxy-4-(3-prop-2-enoxypropoxy)benzene, 6-(4'-Hydroxyphenoxy)-1-Hexene, 4-but-3-enoxyphenol, 1-allyloxy-4-butoxybenzene, 1-allyloxy-4-ethoxybenzene, 1-allyl-4-benzyloxybenzene, 1-allyl-4-(phenoxy)benzene, 1-allyl-3-(phenoxy)benzene, 1-allyl-2-(phenoxy)benzene, 1-allyl-4-(phenyl carbonyl)benzene, 1-allyl-3-(phenyl carboxy)benzene, 1-allyl-2-(phenoxycarbonyl)benzene, 1,2-allyl phenyl benzene, 1,3-allyl phenyl benzene, 1,4-allyl phenyl benzene, 4-vinyl-1,1'-(4'-phenyl)biphenylene, 1-allyl-4-(phenyloxy)benzene, 1-allyl-3-(phenyloxy)benzene, 1-allyl-2-(phenyloxy)benzene, 1-allyl-4-(phenyl carbonyl)benzene, 1-allyl-3-(phenyl carboxy)benzene, and 1-allyl-2-(phenoxycarbonyl)benzene, 1-vinyl naphthylene, 2-vinyl naphthylene, 1-allyl naphthalene, 2-allyl naphthalene, allyl-2-naphthyl ether, 2-(2-methylprop-2-enyl)naphthalene, 2-prop-2-enylnaphthalene, 4-(2-naphthyl)-1-butene, 1-(3-butenyl)naphthalene, 1-allyl naphthalene, 2-allyl naphthalene, 1-allyl-4-napthyl naphthalene, 2-(allyloxy)-1-bromonaphthalene, 2-bromo-6-allyloxynaphthalene, 1,2-vinyl(1-naphthyl)benzene, 1,2-vinyl(2-naphthyl)benzene, 1,3-vinyl(1-naphthyl)benzene, 1,3-vinyl(2-naphthyl)benzene, 1,4-vinyl(1-naphthyl)benzene, 1,4-vinyl(2-naphthyl)benzene, 1-naphthyl-4-vinyl naphthalene, 1-allyl naphthalene, 2-allyl naphthalene, 1,2-allyl(1-naphthyl) benzene, 1,2-allyl(2-naphthyl)benzene, 1,3-allyl(1-naphthyl)benzene, 1,3-allyl(2-naphthyl)benzene, 1,4-allyl(1-naphthyl)benzene, 1,4-allyl(2-naphthyl)benzene, 1-allyl-4-napthyl naphthalene, 1-vinyl anthracene, 2-vinyl anthracene, 9-vinyl anthracene, 1-allyl anthracene, 2-allyl anthracene, 9-allyl anthracene, 9-pent-4-enylanthracene, 9-allyl-1,2,3,4-tetrachloroanthracene, 1-vinyl phenanthrene, 2-vinyl phenanthrene, 3-vinyl phenanthrene, 4-vinyl phenanthrene, 9-vinyl phenanthrene, 1-allyl phenanthrene, 2-allyl phenanthrene, 3-allyl phenanthrene, 4-allyl phenanthrene, 9-allyl phenanthrene, or a combination thereof.

17. The embedded silicone hydrogel contact lens of any one of embodiments 1 to 16, wherein the crosslinked polymeric material of the insert comprises repeating units of at least one aryl vinylic crosslinker.

18. The embedded silicone hydrogel contact lens of embodiment 17, wherein said at least one aryl vinylic crosslinker comprises divinylbenzene, 2-methyl-1,4-divinylbenzene, bis(4-vinylphenyl)methane, 1,2-bis(4-vinylphenyl)ethane, 1,4-diisopropenylbenzene, 1,2-bis(4-vinylphenyl)-1,2-ethanediol, 1,3-bis-methacryloyloxy-benzene, 1,4-phenylene dimethacrylate, bisphenol A dimethacrylate, bisphenol A glycerolate dimethacrylate, 2,5-bis{[2-(methacryloyloxy]ethoxy]carbonyl}terephthalic acid, 4-(methacryloyloxy)styrene, 2-[2-(benzyloxy)ethoxy]ethyl acrylate; 2-[2-(benzyloxy)ethoxy]ethyl methacrylate, or a combination thereof.

19. The embedded silicone hydrogel contact lens of any one of embodiments 1 to 18, wherein the crosslinked polymeric material of the insert comprises repeating units of a high RI polydiorganosiloxane vinylic crosslinker that comprises: (1) a polydiorganosiloxane segment comprising aryl-containing siloxane units each having an organic substituent having up to 45 carbon atoms and at least one aryl moiety (preferably linked to Si atom through a linker having at least 2, preferably 3 carbon atoms); and (2) ethylenically-unsaturated groups (preferably (meth)acryloyl groups).

20. The embedded silicone hydrogel contact lens of embodiment 19, wherein the polydiorganosiloxane segment comprises at least 30% by mole of the aryl-containing siloxane units.

21. The embedded silicone hydrogel contact lens of embodiment 19, wherein the polydiorganosiloxane segment comprises at least 40% by mole of the aryl-containing siloxane units.

22. The embedded silicone hydrogel contact lens of embodiment 19, wherein the polydiorganosiloxane segment comprises at least 50% by mole of the aryl-containing siloxane units.

23. The embedded silicone hydrogel contact lens of embodiment 19, wherein the polydiorganosiloxane segment comprises at least 60% by mole of the aryl-containing siloxane units.

24. The embedded silicone hydrogel contact lens of embodiment 19, wherein the polydiorganosiloxane segment comprises at least 70% by mole of the aryl-containing siloxane units.

25. The embedded silicone hydrogel contact lens of any one of embodiments 19 to 24, wherein the polysiloxane vinylic crosslinker has a number average molecular weight of at least 1000 Daltons.

26. The embedded silicone hydrogel contact lens of any one of embodiments 19 to 24, wherein the polydiorganosiloxane vinylic crosslinker has a number average molecular weight of from about 1500 Daltons to about 100000 Daltons.

27. The embedded silicone hydrogel contact lens of any one of embodiments 19 to 24, wherein the polydiorganosiloxane vinylic crosslinker has a number average molecular weight of from 2000 Daltons to 80000 Daltons.

28. The embedded silicone hydrogel contact lens of any one of embodiments 19 to 24, wherein the polydiorganosiloxane vinylic crosslinker has a number average molecular weight of from 2500 to 60000 Daltons.

29. The embedded silicone hydrogel contact lens of any one of embodiments 19 to 28, wherein the polydiorganosiloxane vinylic crosslinker is defined by formula (1)

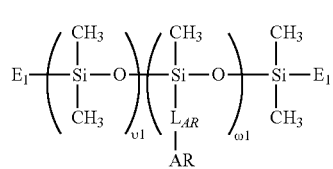

in which:
$\upsilon 1$ is an integer of from 1 to 400;
$\omega 1$ is an integer of from 1 to 800;
$E_1$ is a monovalent radical of

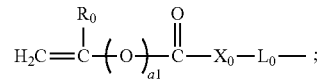

$R_0$ is hydrogen or methyl;
a1 is zero or 1;
$X_0$ is O or $NR_{N1}$;
$R_{N1}$ is hydrogen or a $C_1$-$C_6$ alkyl;
$L_0$ is a $C_2$-$C_8$ alkylene divalent radical or a divalent radical of

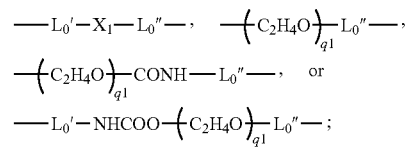

$L_0'$ is a $C_2$-$C_8$ alkylene divalent radical;
$L_0''$ is $C_3$-$C_8$ alkylene divalent radical;
$X_1$ is —O—, —$NR_{N1}$—, —NHCOO—, —OCONH—, —$CONR_{N1}$—, or —$NR_{N1}$CO—;
q1 is an integer of 1 to 10;
AR is an aryl radical;
$L_{AR}$ is a divalent radical of

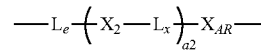

$L_e$ is a divalent radical of

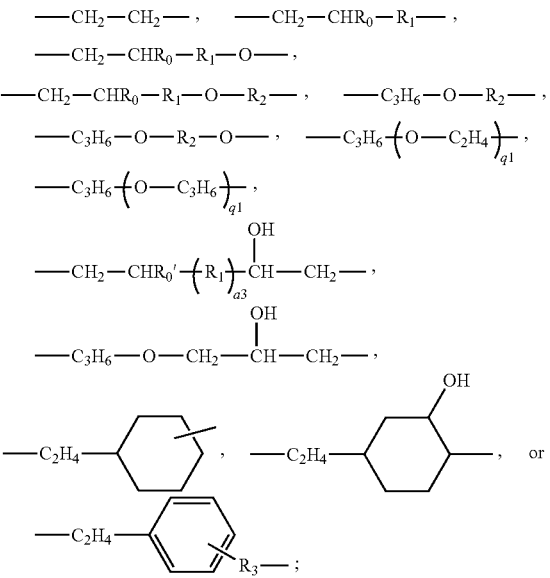

a2 is zero or 1 or 2;

a3 is zero or 1;

$R_1$ is a linear or branched $C_1$-$C_{10}$ alkylene divalent radical which is optionally substituted with $C_1$-$C_4$ alkoxy group, hydroxyl group, carboxyl group, amino group, oxo group, or combinations thereof;

$R_2$ is a linear or branched $C_3$-$C_{10}$ alkylene divalent radical;

$R_3$ is a direct bond or a linear or branched $C_1$-$C_4$ alkylene divalent radical;

$X_{AR}$ and each $X_2$ independently of others are a covalent bond or a covalent linkage of

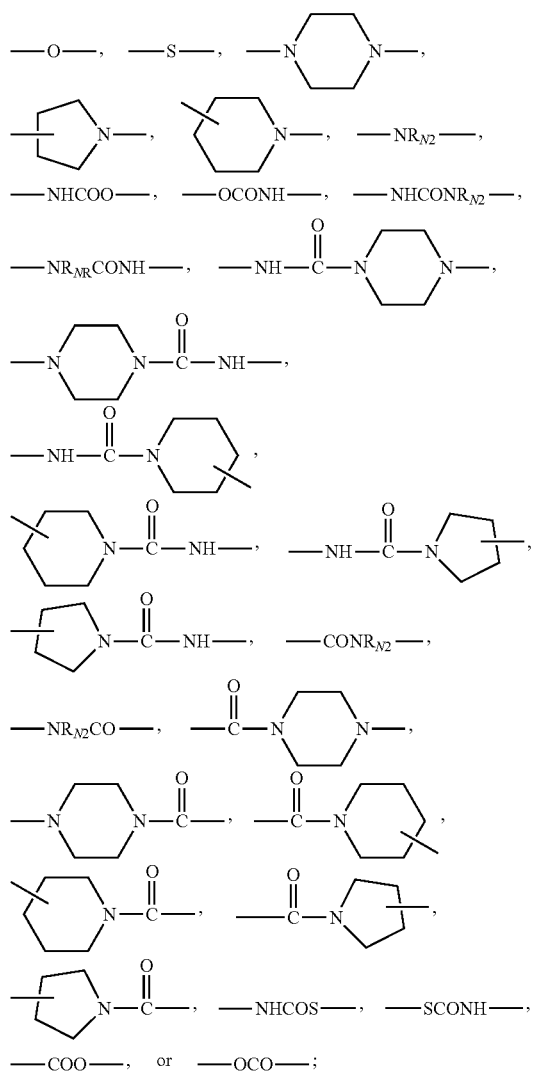

$R_{N2}$ is hydrogen, a linear or branched $C_1$-$C_6$ alkyl, cyclohexyl, cyclopentyl, a substituted or unsubstituted phenyl, or a substituted- or unsubstituted-phenyl-$C_1$-$C_6$ alkyl;

each $L_x$ independently is a linear or branched $C_1$-$C_{10}$ alkylene divalent radical which optionally has one or more hydroxyl or $C_1$-$C_4$-alkoxy groups or $C_1$-$C_4$-acylamino groups,

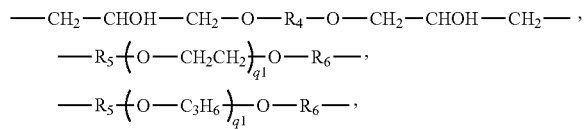

or a divalent radical which optionally has one or more hydroxyl or $C_1$-$C_4$-alkoxy groups and is obtained by removal of two hydrogen atoms from two different atoms of a hydrocarbon that has up to 20 carbon atoms and comprises at least one divalent radical selected from the group consisting of cycloalkylene radical, substituted cycloalkylene radical, phenylene radical, substituted phenylene radical, cycloheteroalkylene radical, and substituted cycloheteroalkylene radical; and each $R_4$, $R_5$ and $R_6$ independent of one another are a linear or branched $C_1$-$C_{10}$ alkylene divalent radical which has zero or one hydroxyl group.

30. The embedded silicone hydrogel contact lens of embodiment 29, wherein in formula (1) υ1 is an integer of from 3 to 350.

31. The embedded silicone hydrogel contact lens of embodiment 29, wherein in formula (1) υ1 is an integer of from 5 to 300.

32. The embedded silicone hydrogel contact lens of embodiment 29, wherein in formula (1) υ1 is an integer of from 10 to 250.

33. The embedded silicone hydrogel contact lens of any one of embodiments 29 to 32, wherein in formula (1) ω1 is an integer of from 5 to 700.

34. The embedded silicone hydrogel contact lens of any one of embodiments 29 to 32, wherein in formula (1) ω1 is an integer of from 10 to 600.

35. The embedded silicone hydrogel contact lens of any one of embodiments 29 to 32, wherein in formula (1) ω1 is an integer of from 15 to 500.

36. The embedded silicone hydrogel contact lens of any one of embodiments 29 to 35, wherein in formula (1) a1 is zero.

37. The embedded silicone hydrogel contact lens of embodiment 36, wherein formula (1) $X_0$ is O.

38. The embedded silicone hydrogel contact lens of embodiment 36, wherein formula (1) $X_0$ is $NR_{N1}$.

39. The embedded silicone hydrogel contact lens of any one of embodiments 29 to 38, wherein in formula (1) (ω1/(υ1+ω1) is from about 0.30 to about 0.95.

40. The embedded silicone hydrogel contact lens of any one of embodiments 29 to 38, wherein in formula (1) (ω1/(υ1+ω1) is from about 0.40 to about 0.90.

41. The embedded silicone hydrogel contact lens of any one of embodiments 29 to 38, wherein in formula (1) (ω1/(υ1+ω1) is from about 0.50 to about 0.90.

42. The embedded silicone hydrogel contact lens of any one of embodiments 29 to 38, wherein in formula (1) (ω1/(υ1+ω1) is from about 0.60 to about 0.85.

43. The embedded silicone hydrogel contact lens of any one of embodiments 29 to 42, wherein in formula (1) AR is a phenyl group, a substituted phenyl group, a naphthyl group, a substituted naphthyl group, an anthracenyl group, a substituted anthracenyl group, a phenanthryl group, or a substituted phenanthryl group.

44. The embedded silicone hydrogel contact lens of any one of embodiments 29 to 42, wherein in formula (1) AR is a monovalent radical of

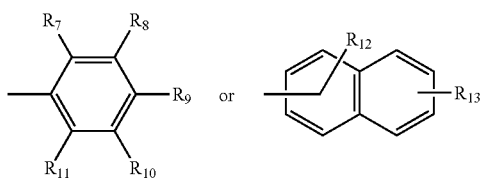

which $R_7$, $R_8$, $R_9$, $R_{10}$, $R_{11}$, $R_{12}$, and $R_{13}$ independent of one another are H, Cl, Br, F, $CF_3$, $CCl_3$, $C_1$-$C_5$ alkyl, $C_1$-$C_5$ alkoxy, $C_2$-$C_5$ acyloxy, OH, phenyl, phenoxy, benzyloxy, phenylcarbonyl, phenoxycarbonyl, phenylcarboxy (phenylcarbonyloxy), or naphthyl.

45. The embedded silicone hydrogel contact lens of any one of embodiments 13 to 44, wherein the crosslinked polymeric material of the insert further comprises: (a) repeating units of at least one first hydrophobic non-silicone vinylic monomer; (b) repeating units of at least one first non-silicone vinylic crosslinker; (c) repeating units of at least one first polymerizable material selected from the group consisting of a first UV-absorbing vinylic monomer, a first UV/high-energy-violet-light ("HEVL") absorbing vinylic monomer, a first polymerizable photochromic compound, a first polymerizable tinting agent, and combinations thereof; or (d) combinations thereof.

46. The embedded silicone hydrogel contact lens of any one of embodiments 1 to 45, wherein the silicone hydrogel bulk material comprises (1) repeating units of at least one silicone-containing polymerizable component that comprises at least 0.5 meq/g of H-bond donors and (2) repeating units of at least one hydrophilic vinylic monomer.

47. The embedded silicone hydrogel contact lens of embodiment 46, wherein the silicone-containing polymerizable component comprises a first silicone-containing vinylic monomer, a first silicone-containing vinylic crosslinker, or both.

48. The embedded silicone hydrogel contact lens of embodiment 47, wherein the silicone-containing polymerizable component comprises a first silicone-containing vinylic monomer selected from the group consisting of [3-(meth)acryloxy-2-hydroxypropyloxy] propyl-bis(trimethylsiloxy)methylsilane, [3-(meth) acryloxy-2-hydroxypropyloxy]propyl-bis(trimethylsiloxy)butylsilane, 3-(meth)acryloxy-2-(2-hydroxyethoxy)-propyloxy)-propylbis (trimethylsiloxy)methylsilane, 3-(meth)acryloxy-2-hydroxypropyloxy)propyl-tris(trimethylsiloxy)silane, N-[tris(trimethylsiloxy)silylpropyl]-(meth)acrylamide, N-(2-hydroxy-3-(3-(bis(trimethylsilyloxy)methylsilyl) propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)silylpropyl]-(meth)acrylamide, N-[tris(dimethylphenylsiloxy)-silylpropyl] (meth)acrylamide, N-[tris (dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy) methylsilyl)propyloxy)-propyl] (meth)acrylamide, N,N-bis[2-hydroxy-3-(3-(tris(trimethylsilyloxy)silyl) propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl] (meth)acrylamide, N,N-bis [2-hydroxy-3-(3-(t-butyldimethylsilyl)propyloxy)propyl]-2-methyl (meth)acrylamide, N-2-(meth) acryloxyethyl-O-(methyl-bis-trimethylsiloxy-3-propyl)silyl carbamate, 3-[tris(trimethylsiloxy)silyl] propylvinyl carbamate, 3-[tris(trimethylsiloxy)silyl] propyl allyl carbamate, α-(meth)acryloxy-terminated ω-$C_1$-$C_6$-hydroxyalkyl terminated polydimethylsiloxanes having a number average molecular weight of 2000 daltons or less, α-(meth)acrylamido-terminated ω-$C_1$-$C_6$-hydroxyalkyl terminated polydimethylsiloxanes having a number average molecular weight of 2000 daltons or less, α-(meth)acryloxy-2-hydroxypropyloxypropyl terminated ω-$C_1$-$C_4$-alkyl terminated polydimethylsiloxanes having a number average molecular weight of 2000 daltons or less, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxanes having a number average molecular weight of 2000 daltons or less, α-[3-(meth)acryloxy-propyloxy-2-hydroxypropyloxy-propyl]-terminated ω-$C_1$-$C_4$-alkyl terminated polydimethylsiloxanes having a number average molecular weight of 2000 daltons or less, α-[3-(meth)acryloxy-isopropyloxy-2-hydroxypropyloxypropyl]-terminated ω-$C_1$-$C_4$-alkyl terminated polydimethylsiloxane having a number average molecular weight of 2000 daltons or less, α-[3-(meth)acryloxybutyloxy-2-hydroxypropyloxypropyl]-terminated ω-$C_1$-$C_4$-alkyl terminated polydimethylsiloxanes having a number average molecular weight of 2000 daltons or less, α-[3-(meth) acryloxyethylamino-2-hydroxypropyloxypropyl]-terminated ω-$C_1$-$C_4$-alkyl terminated polydimethylsiloxanes having a number average molecular weight of 2000 daltons or less, α-[3-(meth)acryloxypropylamino-2-hydroxypropyloxy-propyl]-terminated ω-$C_1$-$C_4$-alkyl terminated polydimethylsiloxanes having a number average molecular weight of 2000 daltons or less, α-[3-(meth)acryloxy-butylamino-2-hydroxypropyloxypropyl]-terminated ω-$C_1$-$C_4$-alkyl terminated polydimethylsiloxanes having a number average molecular weight of 2000 daltons or less, α-(meth) acryloxy-(polyethylenoxy)-2-hydroxypropyloxypropyl]-terminated ω-$C_1$-$C_4$-alkyl terminated polydimethylsiloxanes having a number average molecular weight of 2000 daltons or less, α-[(meth)acryloxy-2-hydroxypropyloxy-ethoxypropyl]-terminated ω-$C_1$-$C_4$-alkyl terminated polydimethylsiloxanes having a number average molecular weight of 2000 daltons or less, α-[(meth)acryloxy-2-hydroxypropyl-N-ethylaminopropyl]-terminated ω-$C_1$-$C_4$-alkyl terminated polydimethylsiloxanes having a number average molecular weight of 2000 daltons or less, α-[(meth)acryloxy-2-hydroxypropyl-aminopropyl]-terminated ω-$C_1$-$C_4$-alkyl terminated polydimethylsiloxanes having a number average molecular weight of 2000 daltons or less, α-[(meth)acryloxy-2-hydroxypropyloxy-(polyethylenoxy)propyl]-terminated ω-$C_1$-$C_4$-alkyl terminated polydimethylsiloxanes having a number average molecular weight of 2000 daltons or less, α-(meth) acrylamidopropyloxypropyl terminated ω-$C_1$-$C_4$-alkyl terminated polydimethylsiloxanes having a number average molecular weight of 2000 daltons or less, α-[3-(meth)acrylamidoethoxy-2-hydroxypropyloxypropyl]-terminated ω-$C_1$-$C_4$-alkyl polydimethylsiloxanes having a number average molecular weight of 2000 daltons or less, α-[3-(meth)acrylamidopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidoisopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidobutyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamido-2-hydroxypropyloxypropyl] terminated ω-$C_1$-$C_4$-alkyl polydimethylsiloxanes having a number average molecular weight of 2000 daltons or less, α-[3-[N-methyl-(meth)acrylamido]-2-hydroxypropyloxypropyl] terminated ω-$C_1$-$C_4$-alkyl terminated polydimethylsiloxanes having a number average molecular weight of 2000 daltons or less, N-(2,3-dihydroxypropane)-N'-(propyltetra(dimethylsiloxy)-dimethylbutylsilane) (meth)acrylamide, (meth)acrylamidopropyltetra(dimethylsiloxy)-dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, and combinations thereof.

49. The embedded silicone hydrogel contact lens of embodiment 47, wherein the silicone-containing polymerizable component is a first silicone-containing vinylic monomer selected from the group consisting of [3-(meth)acryloxy-2-hydroxypropyloxy]propyl-bis(trimethylsiloxy)methylsilane, [3-(meth)acryloxy-2-hydroxypropyloxy]propyl-bis(trimethylsiloxy)butylsilane, 3-(meth)acryloxy-2-(2-hydroxyethoxy)-propyloxy)propyl-bis(trimethylsiloxy)methylsilane, 3-(meth)acryloxy-2-hydroxypropyloxy)propyl-tris(trimethylsiloxy)silane, N-(2-hydroxy-3-(3-(bis(trimethylsilyloxy)methylsilyl)-propyloxy)propyl)-2-methyl (meth)acrylamide, N-(2-hydroxy-3-(3-(bis(trimethylsilyloxy)-methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl](meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl](meth)acrylamide, N,N-bis[2-hydroxy-3-(3-(t-butyldimethylsilyl)propyloxy)-propyl]-2-methyl (meth)acrylamide, α-(meth)acryloxy-terminated ω-$C_1$-$C_6$-hydroxyalkyl terminated polydimethylsiloxanes having a number average molecular weight of 2000 daltons or less, α-(meth)acrylamido-terminated ω-$C_1$-$C_6$-hydroxyalkyl terminated polydimethylsiloxanes having a number average molecular weight of 2000 daltons or less, α-(meth)acryloxy-2-hydroxypropyloxypropyl terminated ω-$C_1$-$C_4$-alkyl terminated polydimethylsiloxanes having a number average molecular weight of 2000 daltons or less, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxanes having a number average molecular weight of 2000 daltons or less, α-[3-(meth)acryloxy-propyloxy-2-hydroxypropyloxypropyl]-terminated ω-$C_1$-$C_4$-alkyl terminated polydimethylsiloxanes having a number average molecular weight of 2000 daltons or less, α-[3-(meth)acryloxyisopropyloxy-2-hydroxypropyloxypropyl]-terminated ω-$C_1$-$C_4$-alkyl terminated polydimethylsiloxane having a number average molecular weight of 2000 daltons or less, α-[3-(meth)acryloxybutyloxy-2-hydroxypropyloxypropyl]-terminated ω-$C_1$-$C_4$-alkyl terminated polydimethylsiloxanes having a number average molecular weight of 2000 daltons or less, α-[3-(meth)acryloxyethylamino-2-hydroxypropyloxypropyl]-terminated ω-$C_1$-$C_4$-alkyl terminated polydimethylsiloxanes having a number average molecular weight of 2000 daltons or less, α-[3-(meth)acryloxypropylamino-2-hydroxypropyloxy-propyl]-terminated ω-$C_1$-$C_4$-alkyl terminated polydimethylsiloxanes having a number average molecular weight of 2000 daltons or less, α-[3-(meth)acryloxy-butylamino-2-hydroxypropyloxypropyl]-terminated ω-$C_1$-$C_4$-alkyl terminated polydimethylsiloxanes having a number average molecular weight of 2000 daltons or less, α-(meth)acryloxy-(polyethylenoxy)-2-hydroxypropyloxypropyl]-terminated ω-$C_1$-$C_4$-alkyl terminated polydimethylsiloxanes having a number average molecular weight of 2000 daltons or less, α-[(meth)acryloxy-2-hydroxypropyloxy-ethoxypropyl]-terminated ω-$C_1$-$C_4$-alkyl terminated polydimethylsiloxanes having a number average molecular weight of 2000 daltons or less, α-[(meth)acryloxy-2-hydroxypropyl-N-ethylaminopropyl]-terminated ω-$C_1$-$C_4$-alkyl terminated polydimethylsiloxanes having a number average molecular weight of 2000 daltons or less, α-[(meth)acryloxy-2-hydroxypropyl-aminopropyl]-terminated ω-$C_1$-$C_4$-alkyl terminated polydimethylsiloxanes having a number average molecular weight of 2000 daltons or less, α-[(meth)acryloxy-2-hydroxypropyloxy-(polyethylenoxy)propyl]-terminated ω-$C_1$-$C_4$-alkyl terminated polydimethylsiloxanes having a number average molecular weight of 2000 daltons or less, α-[3-(meth)acrylamidoethoxy-2-hydroxy-propyloxy-propyl]-terminated ω-$C_1$-$C_4$-alkyl polydimethylsiloxanes having a number average molecular weight of 2000 daltons or less, α-[3-(meth)acrylamidopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidoisopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidobutyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamido-2-hydroxypropyloxypropyl] terminated ω-$C_1$-$C_4$-alkyl polydimethylsiloxanes having a number average molecular weight of 2000 daltons or less, α-[3-[N-methyl-(meth)acrylamido]-2-hydroxy-propyloxypropyl] terminated ω-$C_1$-$C_4$-alkyl terminated polydimethylsiloxanes having a number average molecular weight of 2000 daltons or less, N-(2,3-dihydroxypropane)-N'-(propyltetra(dimethylsiloxy)-dimethylbutylsilane) (meth)acrylamide, and combinations thereof.

50. The embedded silicone hydrogel contact lens of any one of embodiments 46 to 49, wherein the silicone-containing polymerizable component comprises a first silicone-containing vinylic crosslinker selected from the group consisting of di-(meth)acrylamido-terminated polysiloxane vinylic crosslinkers having a number average molecular weight of 4000 Daltons or less, α,ω-bis[3-(meth)acryloxy-2-hydroxypropyloxypropyl]-terminated polydimethylsiloxanes having a number average molecular weight of 4000 Daltons or less, α,ω-bis[3-(meth)acryloxyethoxy-2-hydroxypropyloxypropyl]-terminated polydimethylsiloxanes having a number average molecular weight of 4000 Daltons or less, α,ω-bis[3-(meth)acryloxypropyloxy-2-hydroxypropyloxypropyl]-terminated polydimethylsiloxanes having a number average molecular weight of 4000 Daltons or less, α,ω-bis[3-(meth)acryloxy-isopropyloxy-2-hydroxypropyloxypropyl]-terminated polydimethylsiloxanes having a number average molecular weight of 4000 Daltons or less, α,ω-bis[3-(meth)acryloxybutyloxy-2-hydroxypropyloxypropyl]-terminated polydimethylsiloxanes having a number average molecular weight of 4000 Daltons or less, α,ω-bis[3-(meth)acrylamidoethoxy-2-hydroxypropyloxypropyl]-terminated polydimethylsiloxanes having a number average molecular weight of 8000 Daltons or less, α,ω-bis[3-(meth)acrylamidopropyloxy-2-hydroxypropyloxypropyl]-terminated polydimethylsiloxanes having a number average molecular weight of 8000 Daltons or less, α,ω-bis[3-(meth)acrylamidoisopropyloxy-2-hydroxypropyloxypropyl]-terminated polydimethylsiloxanes having a number average molecular weight of 4000 Daltons or less, α,ω-bis[3-(meth)acrylamidobutyloxy-2-hydroxypropyloxypropyl]-terminated polydimethylsiloxanes having a number average molecular weight of 8000 Daltons or less, α,ω-bis[3-(meth)acryloxyethylamino-2-hydroxypropyloxypropyl]-terminated polydimethylsiloxanes having a number average molecular weight of 8000 Daltons or less, α,ω-bis[3-(meth)acryloxypropylamino-2-hydroxypropyloxypropyl]-terminated polydimethylsiloxanes having a number average molecular weight of 8000 Daltons or less, α,ω-bis[3-(meth)acryloxybutylamino-2-hydroxypropyloxypropyl]-terminated polydimethylsiloxanes having a number average molecular weight of 8000 Daltons or less, α,ω-bis[(meth)acrylamidoethylamino-2-hydroxypropyloxy-propyl]-terminated polydimethylsiloxanes having a number average molecular weight of 12000 Daltons or less, α,ω-bis[3-(meth)acrylamidopropylamino-2-hydroxypropyloxypropyl]-terminated polydimethylsiloxanes having a number average molecular weight of 4000 Daltons or less, α,ω-bis[3-(meth)acrylamide-butylamino-2-hydroxypropyloxypropyl]-terminated polydimethylsiloxanes having a number average molecular weight of 4000 Daltons or less, α,ω-bis[(meth)acryloxy-2-hydroxypropyloxy-ethoxypropyl]-terminated polydimethylsiloxanes having a number average molecular weight of 4000 Daltons or less, α,ω-bis[(meth)acryloxy-2-hydroxypropyl-N-ethylaminopropyl]-terminated polydimethylsiloxanes having a number average molecular weight of 12000 Daltons or less, α,ω-bis[(meth)acryloxy-2-hydroxypropyl-aminopropyl]-polydimethylsiloxanes having a number average molecular weight of 8000 Daltons or less, α,ω-bis[(meth)acryloxy-2-hydroxypropyloxy-(polyethylenoxy)propyl]-terminated polydimethylsiloxane having a number average molecular weight of 4000 Daltons or less, α,ω-bis[(meth)acryloxyethyl-aminocarbonyloxy-ethoxypropyl]-terminated polydimethylsiloxanes having a number average molecular weight of 4000 Daltons or less, α,ω-bis[(meth)acryloxyethyl-amino-carbonyloxy-(polyethylenoxy)propyl]-terminated polydimethylsiloxanes having a number average molecular weight of 4000 Daltons or less, di-(meth)acryloyloxy-terminated or di-(meth)acrylamido-terminated chain-extended polysiloxane vinylic crosslinkers each of which comprises at least two polysiloxane segments and linkages between each pair of polysiloxane segments and between one (meth)acryloyloxy group and one polysiloxane segment and each linkage has at least one H-bond donor, a polysiloxane vinylic crosslinkers having dimethylsiloxane units and hydrophilized siloxane units each having one methyl substituent and one monovalent $C_4$-$C_{40}$ organic radical substituent having at least one H-bond donor (preferably 2 to 6 hydroxyl groups), and combinations thereof.

51. The embedded silicone hydrogel contact lens of any one of embodiments 46 to 49, wherein the silicone-containing polymerizable component comprises a first silicone-containing vinylic crosslinker that comprises at least two urethane linkages (—O—CO—NH—), at least two urea linkages (—NH—CO—NH—), at least two hydroxyl groups, or combinations thereof.

52. The embedded silicone hydrogel contact lens of any one of embodiments 46 to 51, wherein said at least one hydrophilic vinylic monomer comprises at least one alkyl (meth)acrylamide, at least one hydroxyl-containing acrylic monomer, at least one amino-containing acrylic monomer, at least one carboxyl-containing acrylic monomer, at least one N-vinyl amide monomer, at least one methylene-containing pyrrolidone monomer, at least one acrylic monomer having a $C_1$-$C_4$ alkoxyethoxy group, at least one vinyl ether monomer, at least one allyl ether monomer, at least one phosphorylcholine-containing vinylic monomer, N-2-hydroxyethyl vinyl carbamate, N-carboxyvinyl-β-alanine (VINAL), N-carboxyvinyl-α-alanine, or combinations thereof.

53. The embedded silicone hydrogel contact lens of embodiment 52, wherein said at least one alkyl (meth)acrylamide is selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

54. The embedded silicone hydrogel contact lens of embodiment 52 or 53, wherein said at least one hydroxyl-containing acrylic monomer is selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof.

55. The embedded silicone hydrogel contact lens of embodiment 52, 53 or 54, wherein said at least one carboxyl-containing acrylic monomer is selected from the group consisting of 2-(meth)acrylamidoglycolic acid, (meth)acrylic acid, ethylacrylic acid, 3-(meth)acrylamido-propionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof.

56. The embedded silicone hydrogel contact lens of any one of embodiments 52 to 55, wherein said at least one N-vinyl amide monomer is selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

57. The embedded silicone hydrogel contact lens of any one of embodiments 52 to 56, wherein said at least one methylene-containing pyrrolidone monomer is selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

58. The embedded silicone hydrogel contact lens of any one of embodiments 52 to 57, wherein said at least one acrylic monomer having a $C_1$-$C_4$ alkoxyethoxy group is selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol) ethyl (meth)acrylamide having a number average molecular weight of up to 1500, and combinations thereof.

59. The embedded silicone hydrogel contact lens of any one of embodiments 52 to 58, wherein said at least one vinyl ether monomer is selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof.

60. The embedded silicone hydrogel contact lens of any one of embodiments 52 to 59, wherein said at least one allyl ether monomer is selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof.

61. The embedded silicone hydrogel contact lens of any one of embodiments 52 to 60, wherein said at least one phosphorylcholine-containing vinylic monomer is selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]-propyl-2'-(trimethylammonio)ethylphosphate, 4-[(meth)acryloylamino]butyl-2'-(trimethyl-ammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)ethylphosphate, 2-(vinylcarbonylamino)ethyl-2'-(trimethylammonio)ethylphosphate, 2-(allyloxycarbonylamino)-ethyl-2'-(trimethylammonio)ethyl phosphate, 2-(butenoyloxy)ethyl-2'-(trimethylammonio)-ethylphosphate, and combinations thereof.

62. The embedded silicone hydrogel contact lens of any one of embodiments 46 to 61, wherein the silicone hydrogel bulk material further comprise: repeating units of at least one second silicone-containing vinylic monomer (other than the first silicone-containing vinylic monomer) and/or a second polysiloxane vinylic crosslinker (other than the first polysiloxane vinylic crosslinker); repeating units of at least one second hydrophobic non-silicone vinylic monomer; repeating units of at least one second non-silicone vinylic crosslinkers; repeating units of at least one second polymerizable material selected from the group consisting of a second UV-absorbing vinylic monomer, a second UV/high-energy-violet-light ("HEVL") absorbing vinylic monomer, a second polymerizable photochromic compound, a second polymerizable tinting agent (polymerizable dye), and combinations thereof; or combinations thereof.

63. The embedded silicone hydrogel contact lens of embodiment 45 or 62, wherein said at least one first hydrophobic non-silicone vinylic monomer and said at least one second hydrophobic non-silicone vinylic monomer independent of each other are selected from the group consisting of a non-silicone hydrophobic acrylic monomer, a fluorine-containing acrylic monomer, a vinyl alkanoate, a vinyloxyalkane, styrene, vinyl toluene, vinyl chloride, vinylidene chloride, 1-butene, and combinations thereof.

64. The embedded silicone hydrogel contact lens of embodiment 63, wherein the non-silicone hydrophobic acrylic monomer is methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, or combinations thereof; wherein the fluorine-containing acrylic monomer is perfluorohexylethyl-thio-carbonyl-aminoethyl-methacrylate, a perfluoro-substituted-$C_2$-$C_{12}$ alkyl (meth)acrylate, or combinations thereof; wherein the vinyl alkanoate is vinyl acetate, vinyl propionate, vinyl butyrate, vinyl valerate, or combinations thereof; wherein the vinyloxyalkane is vinyl ethyl ether, propyl vinyl ether, n-butyl vinyl ether, isobutyl vinyl ether, cyclohexyl vinyl ether, t-butyl vinyl ether, or combinations thereof.

65. The embedded silicone hydrogel contact lens of any one of embodiment 45 and 62 to 64, wherein said at least one first non-silicone vinylic crosslinker and said at least one second non-silicone vinylic crosslinker independent of each other are selected from the group consisting of allyl methacrylate, allyl acrylate, triallyl isocyanurate, 2,4,6-triallyloxy-1,3,5-triazine, 1,2,4-trivinylcyclohexane, ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl) isocyanurate triacrylate, tris(2-hydroxyethyl) isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested.

It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10° C.~50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan δ data are calculated by TRIOS software.

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Refractive Index

The refractive index (RI) of inserts is determined by Abbe transmission laboratory refractometer Reichert Abbe Mark III at 25° C. The inserts are fully equilibrated in PBS saline solution before measurement.

The refractive index (RI) of polysiloxane vinylic crosslinker is determined by Rudolph Research Analytical Refractometer (Model J357) at 20° C. The RI of distilled water (RI of 1.33299 at 20.0° C.) is used as reference and is performed before and after the measurement of polysiloxane vinylic crosslinker.

Glass Transition Temperature

Glass transition temperature (Tg) of the insert is defined as the peak of tan δ from the dynamic temperature ramp test by using TA RSA-G2 DMA (Dynamic Mechanical Analyzer).

According to this application, the glass transition temperature (Tg) of a polysiloxane vinylic crosslinker is the midpoint temperature in a differential-scanning-calorimetry diagram obtained by using Differential Scanning Calorimetry (DSC). FIG. 1 shows a DSC diagram obtained for a polysiloxane vinylic crosslinker of the invention and is characterized by its onset, midpoint, inflection and endset temperature.

Delamination

Embedded silicone hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (OPTIMEC England, model JCF). After the contact lens is settled under the influence of gravity, the front view of the contact lens is inspected carefully for any sign of circular pattern. Delamination displays as circular patterns in Optimec image.

OCT (Thorlabs Spectral Domain Optical Coherence Tomography, model Telesto-II) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately % with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Chemicals

The following abbreviations are used in the following examples: BzA represents benzylacrylate; BzMA represents benzyl methacrylate; DVBz represents divinyl Benzene; p-STTMS represents styrenyltrimethoxysilane; PETA represents pentaerythritol tetraacrylate; TrisMA represents 3-[Tris(trimethylsiloxy)silyl]propyl methacrylate; D6 represents monobutyl-terminated monomethacryloxypropyl-terminated polydimethylsiloxane (M.W. 600 to 800 g/mol from Gelest); DMA represents N,N-dimethyl acrylamide; MMA represents methyl methacrylate; TEGDMA represent triethyleneglycol dimethacrylate; Vazo-67 represents 2,2'-Azobis (2-methylbutyronitrile); Ominirad-1173 represents a photoinitiator made of 2-hydroxy-2-methyl-1-phenylpropanone; Nobloc is 2-[3-(2H-Benzotriazol-2-yl)-4-hydroxyphenyl]ethyl methacrylate from Aldrich; RB247 is Reactive Blue 247 (2-Propenoic acid, 2-methyl-, 1,1'-[(9,10-dihydro-9,10-dioxo-1,4-anthracenediyl)bis(imino-2,1-ethanediyl)]ester); TAA represents tert-amyl alcohol; PrOH represents 1-propanol; IPA represents isopropanol; PPG represents poly(propylene glycol); EGBE represents ethylene glycol butyl ether; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; "H4" macromer represents a di-methacryloyloxypropyl-terminated polysiloxane (Mn ~11.3K-12.3K g/mol, OH content 1.82-2.01 meq/g) of formula (A) shown below; "HA" macromer represents a di-methacryloyloxypropyl-terminated polysiloxane (Mn ~6.8K g/mol, OH content ~1.2 meq/g) of formula (A) shown below.

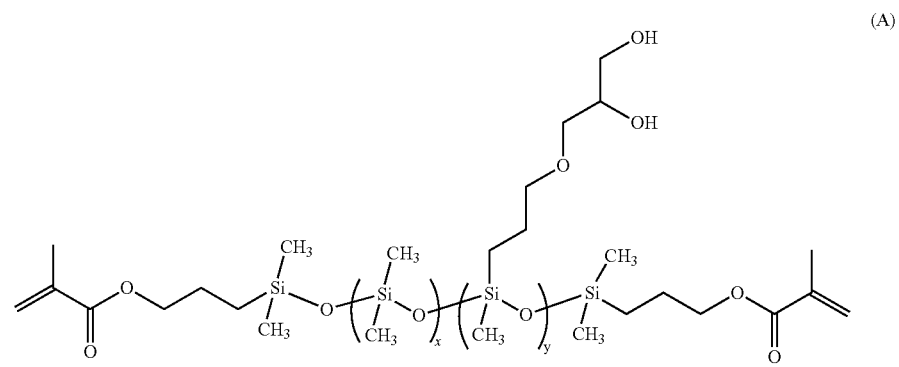

(A)

Example 2

A hydrosiloxane-containing polydiorganosiloxane (precursor for making a polysiloxane vinylic crosslinker of the invention is prepared according to the procedures shown in Scheme 1.

Scheme 1

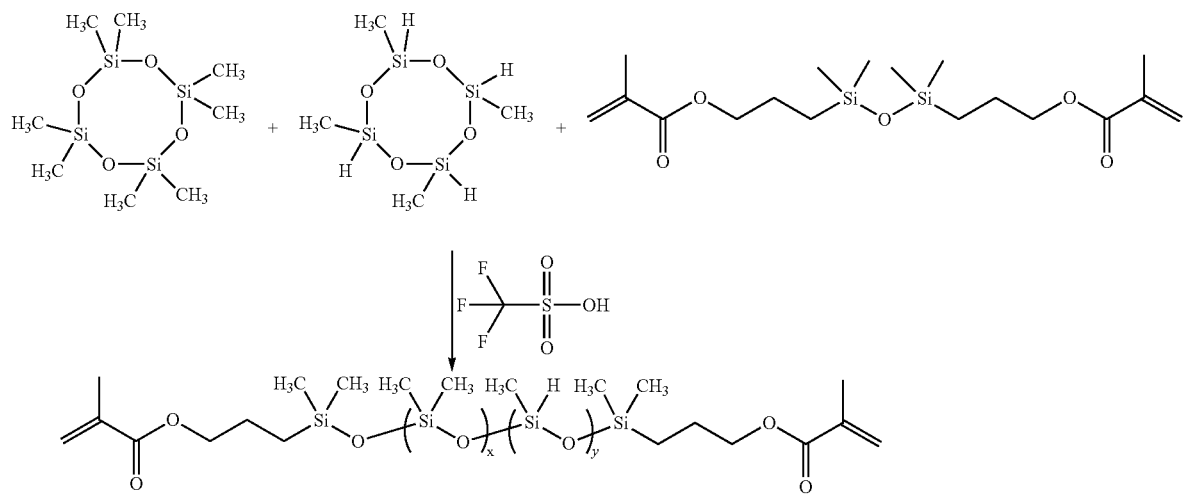

Synthesis of Hydrosiloxane-Containing Polydiorganosiloxane (Mn ~5 KD)

602.05 g of Octamethylcyclotetrasiloxane (D4), 510.32 g of 1,3,5,7-tetramethylcyclotetrasiloxane (D4H) and 92.81 g of 1,3-bis(3-methacryloxypropyl)tetramethyldisiloxane are weighted and premixed in a flask and then charged to a 2-L jacketed reactor equipped with a mechanical motor, thermocouple and nitrogen flow adapter. Then 2.4 g of triflic acid is added via pipet to the stirred reaction mixture. The reaction is allowed to stir at 25° C. for about 16 hours. After the reaction is completed, the solution is diluted with 1000 mL of toluene and then neutralized by a solid base, followed with one hour of stirring. The final mixture is filtered with the use of 0.45 micron Glass Microfiber Filter. At this point, BHT and MEHQ inhibitors are added (250 ppm each). Polymer solution is concentrated on rotavap and then under low vacuum to remove the residual solvent. The resultant precursor is not purified and determined to have a number average molecular weight of about 5,000 g/mol., an averaged x of about 31 (by $^1$H NMR), and an averaged y of about 32 (by $^1$H NMR).

Synthesis of Hydrosiloxane-Containing Polydiorganosiloxane (Mn ~3 KD)

100.19 g of Octamethylcyclotetrasiloxane (D4), 247.39 g of 1,3,5,7-tetramethylcyclotetrasiloxane (D4H) and 51.32 g of 1,3-bis(3-methacryloxypropyl)-tetramethyldisiloxane are weighted and premixed in a flask and then charged to a 1-L jacketed reactor equipped with a mechanical motor, thermocouple and nitrogen flow adapter. Then 0.8 g of triflic acid is added via pipet to the stirred reaction mixture. The reaction is allowed to stir at 25° C. for about 16 hours. After the reaction is completed, the solution is diluted with 200 mL of toluene and then neutralized by a solid base, followed with one hour of stirring. The final mixture is filtered with the use of 0.45 micron Glass Microfiber Filter. At this point, BHT and MEHQ inhibitors are added (250 ppm each). Polymer solution is concentrated on rotavap and then under low vacuum to remove the residual solvent. The resultant precursor is not purified and determined to have a number average molecular weight of about 3,000 g/mol., an averaged x of about 9.4 (by $^1$H NMR), and an averaged y of about 28.1 (by $^1$H NMR).

Example 3

Synthesis of the High Refractive Index Polysiloxane Vinylic Crosslinker

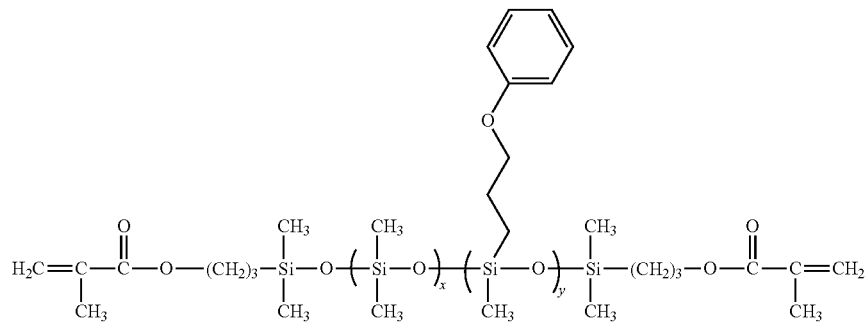

A 500 mL jacketed reactor equipped with a mechanical stirrer, thermocouple, nitrogen feed, septum and condenser is warmed up to 80° C. and purged with nitrogen for 30 min at the rate of 100 mL/min. Allyl phenyl ether (ca. 158.62 g, i.e., in a molar ratio of 2:1 over hydrosiloxane unit), toluene (40 mL), and about 88.1 µL (ca. 25 ppm related to the precursor) of Karstedt's catalyst solution are charged to the reactor. Nitrogen flow was reduced to 50 mL/min. The hydrosiloxane-containing polydiorganosiloxane (Mn ~3 KD) prepared in Example 2 (ca. 60.00 g), MEHQ inhibitor (0.0085 g), and toluene (60-80 mL) are added into the beaker, stirred for 10 min until MEHQ dissolved and charged into two, 100 mL Hamilton Gas Tight syringes equipped with plastic cannula. Each syringe with around 70 mL of polymer solution is secured to a Harvard PHD Infusion syringe pump and feed lines are inserted into the reactor via rubber septum. Solution of the hydrosiloxane-containing polydiorganosiloxane in toluene is added via syringe pump over the course of 5 hours (at rate of 0.2333 mL/min). The temperature of the reactor is maintained at 80±2° C. throughout the course of the reaction. After addition of polymer, the reaction mixture is additionally stirred for 1 h. After this time, IR scan of crude reaction mixture confirms complete consumption of Si—H bonds. The reaction mixture is then cooled down to room temperature and crude polymer is purified by thin-film distillation (temperature of hot finger is 100° C. achieved by refluxing water, reduced pressure is maintained at 1.3-1.9 mbar for the entire process). Collected polymer fraction has a $T_g$ of −48° C. and a refractive index of 1.51553 (at 20° C.). $^1$H NMR spectrum of final product shows no presence of allyl phenyl ether.

The hydrosiloxane-containing polydiorganosiloxane (Mn ~5 KD) prepared in Example 2 is also used to prepare a polysiloxane vinylic crosslinker according to the procedure described in above. The resultant polysiloxane vinylic crosslinker has a refractive index of 1.49617 (at 20° C.).

Example 4

Insert Formulations

Polymerizable compositions (insert formulations) for making inserts are prepared at room temperature in air by blending all the components (materials) in their desired amounts (weight parts units) to have the composition shown in Table 1.

TABLE 1

| | Insert Formulation # (weight part units) | | |
|---|---|---|---|
| | 1 (Insert HRI-2) | 2 (Insert HRI-19) | 3 (Insert HRI-31) |
| TrisMA | 22.2 | 0 | 0 |
| BzMA | 48.3 | 36.2 | 0 |
| BzA | 0 | 0 | 14.9 |
| D6 | 19.3 | 0 | 0 |
| P-STTMS | 0 | 45.2 | 14.9 |
| High RI Si-macromer (Example 3) | 0 | 9 | 49.7 |
| PETA | 9.7 | 9 | 0 |
| DVBz | 0 | 0 | 9.9 |
| RB247 | 0.01 | 0.01 | 0.01 |
| Vazo-67 | 0.5 | 0.5 | 0.5 |

Cast-Molded Inserts

An insert formulation (polymerizable composition) is purged with nitrogen at room temperature for 30 to 35 minutes. The $N_2$-purged polymerizable composition (30-40 mg) is introduced into polypropylene molds and the molds are closed and placed in an oven. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert formulations (polymerizable compositions) in the molds are thermally cured in the oven under the following conditions: holding at 25° C. and a $N_2$ flow rate of 80 scfh (standard cubic foot per hour) for about 30 minutes; ramp from 25° C. to 55° C. at a ramp rate of about 7° C./minute; holding at 55° C. and a $N_2$ flow rate of 40 scfh for about 30 minutes; ramp from 55° C. to 80° C. at a ramp rate of about 7° C./minute; holding at 80° C. and a $N_2$ flow rate of 40 scfh for about 30 minutes; ramp from 80° C. to 100° C. at a ramp rate of about 7° C./minute; and holding at 100° C. and a $N_2$ flow rate of 40 scfh for about 30 minutes. The molds are opened and the molded inserts are removed from the molds.

The inserts may or may not be extracted. Following procedure is used for extraction of inserts (if needed). First, the inserts are extracted with PrOH for about 3 hours, rinsed twice with deionized water for about 10 minutes, and dried in vacuum oven at 50 C and 26 mm Hg for 1 hour. Inserts obtained from insert formulation #1 has a RI of about 1.50; inserts obtained from insert formulation #2 has a RI of about 1.51; inserts obtained from insert formulation #3 has a RI of about 1.55.

SiHy Lens Formulations

Two SiHy lens formulations are prepared at room temperature in air by blending all the components (materials) in their desired amounts (weight parts units) to have the composition shown in Table 2.

TABLE 2

| | SiHy lens Formulation # (weight part units) | |
|---|---|---|
| Chemical components | 1 (Carrier GT-10) | 2 (Carrier GU-1) |
| H4 Macromer | 28.45 | 0 |
| HA Macromer | 0 | 32 |
| TrisMA | 14.66 | 21 |
| DMA | 20.69 | 24 |
| MMA | 12.93 | 0 |
| TEGDMA | 0.86 | 0 |
| EGBE | 21.98 | 22 |
| VAZO 67 | 0.43 | 0.5 |
| Omnirad 1173 | 0 | 1 |

Preparation of SiHy Contact Lenses

Thermally or actinically cast-molded SiHy contact lenses are prepared as follows.

Molding Assembly. An amount (about 50-60 mg) of a SiHy lens formulation prepared above is dosed in a polypropylene female mold half, a polypropylene male mold half is then placed on top the female mold half, and the mold is closed securely to form a molding assembly.

Thermal Curing. The molding assemblies (i.e., closed mold with a SiHy lens formulation therein) are thermally cured in the oven under the following conditions: holding at 25° C. and a $N_2$ flow rate of 80 scfh for about 30 minutes; ramp from 25° C. to 55° C. at a ramp rate of about 7° C./minute; holding at 55° C. and a $N_2$ flow rate of 40 scfh for about 30 minutes; ramp from 55° C. to 80° C. at a ramp rate of about 7° C./minute; holding at 80° C. and a $N_2$ flow rate of 40 scfh for about 30 minutes; ramp from 80° C. to 100° C. at a ramp rate of about 7° C./minute; and holding at 100° C. and a $N_2$ flow rate of 40 scfh for about 30 minutes.

Actinic Curing. The molding assemblies (i.e., closed mold with SiHy lens formulation #5 therein) are fully cured using a double-sided UV curing oven having ~1 mW/cm² intensity (Wicked Engineering, UV LED Module 9W 365 nm/405 nm) for 10 minutes.

Demolding and Delensing. Lens molds each with a molded unprocessed SiHy contact lens therein are mechanically opened. The molded unprocessed SiHy contact lens adhere to the male mold halves or female mold halves. Molded unprocessed SiHy contact lenses adhered to male mold halves are delensed using ultrasonic unit; molded unprocessed SiHy contact lenses adhered to female mold halves are manually delensed from lens-adhered female mold halves.

Post-Delensing Process. The delensed unprocessed SiHy contact lenses can be extracted with a mixture of 50:50 of propylene glycol:water. Preferably, the delensed unprocessed SiHy contact lenses are subjected to the following extraction/hydration, coating, autoclave processes as follows. The unprocessed SiHy contact lenses are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant SiHy contact lenses each have a hydrogel coating thereon.

The lens properties of the resultant SiHy contact lenses are determined according to the procedures described in Example 1 and reported in Table 3.

TABLE 3

| | SiHy Lens Formulation # (weight part units) | |
|---|---|---|
| | 1 | 2 |
| Dk (Barrers) | 114 | 167 |
| Modulus (MPa) | 0.69 | 0.65 |
| WC (% by weight) | 29.5 | 25.0N/A |

Preparation of Fully Embedded SiHy Contact Lenses

Thermally or actinically cast-molded embedded SiHy contact lenses are prepared as follows.

Molding Assembly. An insert prepared above is placed in the central region of the molding surface of a female mold half (made of polypropylene) which preferably has three or more spikes distributed in a circle having a diameter sufficient to accommodate the insert for fixing the position of the insert on the molding surface, an amount (about 50-60 mg) of a SiHy lens formulation prepared above is dosed in the female mold half to immerse the insert, a polypropylene male mold half is then placed on top the female mold half, and the mold is closed securely to form a molding assembly.

Thermal Curing. The molding assemblies (i.e., closed molds each with an insert immersed in a SiHy lens formulation therein) are thermally cured according to procedures described above for making SiHy contact lenses.

Actinic Curing. The molding assemblies (i.e., closed molds each with an insert immersed in SiHy lens formulation #5 therein) are fully cured actinically according to the procedures described for making SiHy contact lenses.

Demolding and Delensing. Demolding and delensing are carried out as described above for making SiHy contact Lenses.

Post-Delensing Process. The delensed unprocessed embedded SiHy contact lenses are subjected to the extraction/hydration, coating, autoclave processes as described above for making SiHy contact lenses. The resultant embedded SiHy contact lenses each have a hydrogel coating thereon.

The resultant embedded SiHy contact lenses are examined for possible delamination under microscopy (i.e., using OCT according to the procedures described in Example 1). No delamination is observed. The embedded SiHy contact lenses show having well-defined lens geometry without distortion after delensing, extraction, coating, hydration and autoclave. It is believed that both the insert and the bulk SiHy material have minimum swell ratio upon hydration, resulting in minimum internal stress and thus good geometry stability over time. The characterization of the embedded SiHy contact lenses are reported in Table 4.

TABLE 4

| Embedded SiHy | Formulation # | | | RI (Insert/ | |
|---|---|---|---|---|---|
| Contact Lens | Insert | SiHy Lens | Delamination | SiHy)[1] | ΔRI[2] |
| #1 | 1 | 1 | No | 1.50/1.43 | 0.07 |
| #2 | 3 | 1 | No | 1.55/1.43 | 0.12 |
| #3 | 3 | 2 | No | 1.55/1.43 | 0.12 |

[1]determined directly with the embedded SiHy contact lenses.
[2]ΔRI = $RI_{insert}$ − $RI_{bulk}$ By having a difference of at least about 0.07, an embedded SiHy contact lens of the invention can find particular use in making diffractive multifocal contact lenses.

Preparation of Partially Embedded SiHy Contact Lenses

Thermally or actinically cast-molded embedded SiHy contact lenses are prepared as follows.

An insert-forming composition (Insert formulation #2) prepared above is purged with nitrogen at room temperature for 30 to 35 minutes. A specific volume (e.g., 30-40 mg) of the $N_2$-purged insert-forming composition is disposed in the center of the molding surface of a female lens mold half that is made of polypropylene and the molding surface defines the anterior surface of a contact lens to be molded. The female lens mold half with the insert-forming composition therein is closed with a male insert mold half which is made of polypropylene and designed to have an overflow groove into which any excess insert-forming composition is pressed during closing for forming a first molding assembly. The male insert mold half has a molding surface defining the posterior surface of an insert to be molded. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert-forming compositions in the first molding assemblies are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The first molding assemblies are opened and the molded inserts are adhered onto the central area of the molding surface of the female lens mold halves.

A lens-forming composition (SiHy lens formulation #1) prepared above is purged with nitrogen at room temperature for 30 to 35 minutes. A specific volume (e.g., 50-60 mg) of the $N_2$-purged lens-forming composition is disposed onto the molded insert adhered onto the central portion of the molding surface of the female lens mold half. The female lens mold half with the insert adhered thereonto and with the lens-forming composition is closed with a male lens mold half which is made of polypropylene and designed to have an overflow groove into which any excess lens-forming composition is pressed during closing for forming a second molding assembly. The male lens mold half has a molding surface defining the posterior surface of a contact lens to be molded. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The closed $2^{nd}$ molding assemblies each with a molded insert immersed in a lens-forming composition in the lens molding cavities are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The $2^{nd}$ molding assemblies each with a molded unprocessed embedded silicone hydrogel contact lens therein are mechanically opened. The molded unprocessed embedded silicone hydrogel contact lens adhere to the male mold halves or female mold halves. Molded unprocessed embedded silicone hydrogel contact lenses adhered to male mold halves are delensed using ultrasonic unit; molded unprocessed embedded silicone hydrogel contact lenses adhered to female mold halves are delensed are manually from lens-adhered female mold halves.

The delensed unprocessed embedded SiHy contact lenses are subjected to the extraction/hydration, coating, autoclave processes as described above for making SiHy contact lenses. The resultant embedded SiHy contact lenses each have a hydrogel coating thereon.

The resultant partially embedded SiHy contact lenses are examined for possible delamination using OCT according to the procedures described in Example 1. No delamination is observed. The embedded SiHy contact lenses show having well-defined lens geometry without distortion after delensing, extraction, coating, hydration and autoclave. It is believed that both the insert and the bulk SiHy material have minimum swell ratio upon hydration, resulting in minimum internal stress and thus good geometry stability over time. The characterization of the embedded SiHy contact lenses are reported in Table 5.

TABLE 5

| Embedded SiHy Contact Lens | Formulation # Insert | Formulation # SiHy Lens | Delamination | RI (Insert/SiHy)[1] | ΔRI[2] |
|---|---|---|---|---|---|
| #4 | 2 | 1 | No | 1.51/1.43 | 0.08 |

[1]determined directly with the embedded SiHy contact lenses.
[2]ΔRI = $RI_{insert} - RI_{bulk}$ By having a difference of at least about 0.08, a partially embedded SiHy contact lens of the invention can find particular use in making diffractive multifocal contact lenses.

All the publications, patents, and patent application publications, which have been cited herein above, are hereby incorporated by reference in their entireties.

What is claimed is:

1. An embedded silicone hydrogel contact lens, comprising:
   a silicone hydrogel bulk material and an insert embedded therein,
   wherein the insert is made of a crosslinked polymeric material having a first refractive index, wherein the silicone hydrogel bulk material has a second refractive index, wherein the first refractive index is at least 0.07 higher than the second refractive index,
   wherein the insert has a front curve surface, an opposite back curve surface and a diameter of less than 13.0 mm, wherein the insert is located in a central portion of the embedded hydrogel contact lens and comprises a diffractive structure disposed on one of the front and back curve surfaces for providing a diffractive power that contributes to the overall optical power of the contact lens, wherein the diffractive structure is buried inside the silicone hydrogel bulk material,
   wherein the embedded silicone hydrogel contact lens is not susceptible to delamination as demonstrated by being free of bubble when being inspected under microscopy at interfaces between the insert and the silicone hydrogel bulk material within the embedded silicone hydrogel contact lens after being autoclaved in a packaging solution in a sealed package for about 45 minutes at 121° C., wherein the packaging solution is a phosphate buffered saline having a pH of 7.1±0.2.

2. The embedded silicone hydrogel contact lens of claim 1, wherein the crosslinked polymeric material of the insert has a refractive index of at least about 1.47 and/or an oxygen permeability of at least about 40 barrers, wherein the crosslinked polymeric material of the insert comprises at least 50% by mole of repeating units (acrylic repeating units) of one or more acrylic monomers and/or crosslinkers.

3. The embedded silicone hydrogel contact lens of claim 2, wherein the crosslinked polymeric material of the insert comprises repeating units of at least one aryl vinylic monomer and/or repeating units of at least one aryl vinylic crosslinker.

4. The embedded silicone hydrogel contact lens of claim 3, wherein said at least one aryl vinylic monomer comprises: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2- methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate; styrene, 2,5-dimethylstyrene, 2-(trifluoromethyl)styrene, 2-chlorostyrene, 3,4-dimethoxystyrene, 3-chlorostyrene, 3-bromostyrene, 3-vinylanisole, 3-methylstyrene, 4-bromostyrene, 4-tert-butylstyrene, p-styryltrimethoxysilane, styrylethyltrimethoxysilane, 2,3,4,5,6-pentanfluorostyrene, 2,4-dimethylstyrene, 1-methoxy-4-vinylbenzene, 1-chloro-4-vinylbenzene, 1-methyl-4-vinylbenzene, 1-(chloromethyl)-4-vinylbenzene, 1-(bromomethyl)-4-vinylbenzene, 3-nitrostyrene, 1,2-vinyl phenyl benzene, 1,3-vinyl phenyl benzene, 1,4-vinyl phenyl benzene, 4-vinyl-1,1'-(4'-phenyl)biphenylene, 1-vinyl-4-(phenyloxy)benzene, 1-vinyl-3-(phenyloxy)benzene, 1-vinyl-2-(phenyloxy)benzene, 1-vinyl-4-(phenyl carbonyl)benzene, 1-vinyl-3-(phenylcarboxy)benzene, 1-vinyl-2-(phenoxycarbonyl)benzene, allyl phenyl ether, 2-biphenylylallyl ether, allyl 4-phenoxyphenyl ether, allyl 2,4,6-tribromophenyl ether, allyl phenyl carbonate, 1-allyloxy-2-trifluoromethylbenzene, allylbenzene, 1-phenyl-2-prop-2-enylbenzene, 4-phenyl-1-butene, 4-phenyl-1-butene-4-ol, 1-(4-methylphenyl)-3-buten-1-ol, 1-(4-chlorophenyl)-3-buten-1-ol, 4-allyltoluene, 1-allyl-4-fluorobenzene, 1-allyl-2-methylbenzene, 1-allyl-3-methylbenzene, 1-allyl-3-methylbenzene, 2-allylanisole, 4-allylanisole, 1-allyl-4-(triflUromethyl)benzene, allylpentafluorobenzene, 1-allyl-2-methoxybenzene, 4-allyl-1,2-dimethoxybenzene, 2-allylphenol, 2-allyl-6-methylphenol, 4-allyl-2-methoxyphenol, 2-allyloxyanisole, 4-allyl-2-methoxyphenyl acetate, 2-allyl-6-methoxyphenol, 1-allyl-2-bromobezene, alpha-vinylbenzyl alcohol, 1-phenyl-3-butene-1-one, allylbenzyl ether, (3-allyloxy)propyl)benzene, allyl phenylethyl ether, 1-benzyloxy-4-pentene, (1-allyloxy)ethyl)benzene, 1-phenylallyl ethyl ether, (2-methyl-2-(2-propenyloxy)propyl)benzene, ((5-hexenyloxy)methyl)benzene, 1-allyloxy-4-propoxybenzene, 1-phenoxy-4-(3-prop-2-enoxypropoxy)benzene, 6-(4'-Hydroxyphenoxy)-1-Hexene, 4-but-3-enoxyphenol, 1-allyloxy-4-butoxybenzene, 1-allyloxy-4-ethoxybenzene, 1-allyl-4-benzyloxybenzene, 1-allyl-4-(phenoxy)benzene, 1-allyl-3-(phenoxy)benzene, 1-allyl-2-(phenoxy)benzene, 1-allyl-4-(phenyl carbonyl)benzene, 1-allyl-3-(phenyl carboxy)benzene, 1-allyl-2-(phenoxycarbonyl)benzene, 1,2-allyl phenyl benzene, 1,3-allyl phenyl benzene, 1,4-allyl phenyl benzene, 4-vinyl-1,1'-(4'-phenyl)biphenylene, 1-allyl-4-(phenyloxy)benzene, 1-allyl-3-(phenyloxy)benzene, 1-allyl-2-(phenyloxy)benzene, 1-allyl-4-(phenyl carbonyl)benzene, 1-allyl-3-(phenyl carboxy) benzene, and 1-allyl-2-(phenoxycarbonyl)benzene, 1-vinyl naphthylene, 2-vinyl naphthylene, 1-allyl naphthalene, 2-allyl naphthalene, allyl-2-naphthyl ether, 2-(2-methylprop-2-enyl)naphthalene, 2-prop-2-enylnaphthalene, 4-(2-naphthyl)-1-butene, 1-(3-butenyl)naphthalene, 1-allyl naphthalene, 2-allyl naphthalene, 1-allyl-4-napthyl naphthalene, 2-(allyloxy)-1-bromonaphthalene, 2-bromo-6-allyloxynaphthalene, 1,2-vinyl(1-naphthyl)benzene, 1,2-vinyl(2-naphthyl)benzene, 1,3-vinyl(1-naphthyl)benzene, 1,3-vinyl(2-naphthyl)benzene, 1,4-vinyl(1-naphthyl)benzene, 1,4-vinyl(2-naphthyl)benzene, 1-naphthyl-4-vinyl naphthalene, 1-allyl naphthalene, 2-allyl naphthalene, 1,2-allyl(1-naphthyl) benzene, 1,2-allyl(2-naphthyl)benzene, 1,3-allyl(1-naphthyl)benzene, 1,3-allyl(2-naphthyl)benzene, 1,4-allyl(1-naphthyl)benzene, 1,4-allyl(2-naphthyl)benzene, 1-allyl-4-napthyl naphthalene, 1-vinyl anthracene, 2-vinyl anthracene, 9-vinyl anthracene, 1-allyl anthracene, 2-allyl anthracene, 9-allyl anthracene, 9-pent-4-enylanthracene, 9-allyl-1,2,3,4-tetrachloroanthracene, 1-vinyl phenanthrene, 2-vinyl phenanthrene, 3-vinyl phenanthrene, 4-vinyl phenanthrene, 9-vinyl phenanthrene, 1-allyl phenanthrene, 2-allyl phenanthrene, 3-allyl phenanthrene, 4-allyl phenanthrene, 9-allyl phenanthrene, or a combination thereof; wherein said at least one aryl vinylic crosslinker comprises divinylbenzene, 2-methyl-1,4-divinylbenzene, bis(4-vinylphenyl)methane, 1,2-bis(4-vinylphenyl)ethane, 1,4-diisopropenylbenzene, 1,2-bis(4-vinylphenyl)-1,2-ethanediol, 1,3-bis-methacryloyloxy-benzene, 1,4-phenylene dimethacrylate, bisphenol A dimethacrylate, bisphenol A glycerolate dimethacrylate, 2,5-bis{[2-(methacryloyloxy)ethoxy]carbonyl}-terephthalic acid, 4-(methacryloyloxy)styrene, 2-[2-(benzyloxy)ethoxy]ethyl acrylate; 2-[2-(benzyloxy)ethoxy]ethyl methacrylate, or a combination thereof.

5. The embedded silicone hydrogel contact lens of claim 2, wherein the crosslinked polymeric material of the insert comprises repeating units of a high RI polydiorganosiloxane vinylic crosslinker that comprises: (1) a polydiorganosiloxane segment comprising aryl-containing siloxane units each having an organic substituent having up to 45 carbon atoms and at least one aryl moiety linked to Si atom through a linker having at least 2 carbon atoms; and (2) ethylenically-unsaturated groups.

6. The embedded silicone hydrogel contact lens of claim 5, wherein the polydiorganosiloxane segment comprises at least 30% by mole of the aryl-containing siloxane units, wherein the polysiloxane vinylic crosslinker has a number average molecular weight of at least 1000 Daltons.

7. The embedded silicone hydrogel contact lens of claim 5, wherein the polydiorganosiloxane vinylic crosslinker is defined by formula (1)

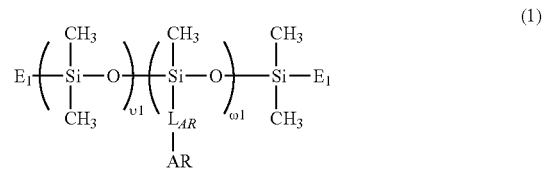

in which:
υ1 is an integer of from 1 to 400;
ω1 is an integer of from 1 to 800;
$E_1$ is a monovalent radical of

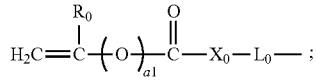

$R_0$ is hydrogen or methyl;
a1 is zero or 1;
$X_0$ is O or $NR_{N1}$;
$R_{N1}$ is hydrogen or a $C_1$-$C_6$ alkyl;
$L_0$ is a $C_2$-$C_8$ alkylene divalent radical or a divalent radical of

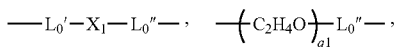
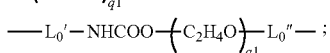

$L_0'$ is a $C_2$-$C_8$ alkylene divalent radical;
$L_0''$ is $C_3$-$C_8$ alkylene divalent radical;
$X_1$ is —O—, —$NR_{N1}$—, —NHCOO—, —OCONH—, —$CONR_{N1}$—, or —$NR_{N1}$CO—;
q1 is an integer of 1 to 10;
AR is an aryl radical;
$L_{AR}$ is a divalent radical of

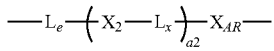

$L_e$ is a divalent radical of

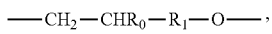
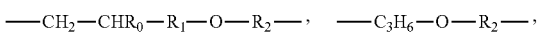
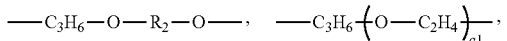
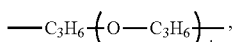
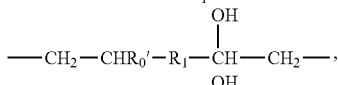
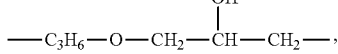
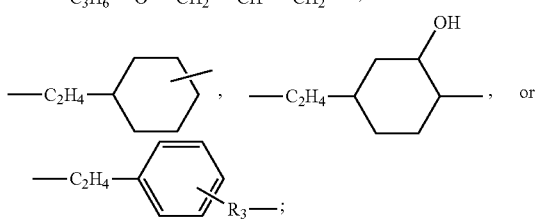

a2 is zero or 1 or 2;
a3 is zero or 1;
$R_1$ is a linear or branched $C_1$-$C_{10}$ alkylene divalent radical which is optionally substituted with $C_1$-$C_4$ alkoxy group, hydroxyl group, carboxyl group, amino group, oxo group, or combinations thereof;
$R_2$ is a linear or branched $C_3$-$C_{10}$ alkylene divalent radical;
$R_3$ is a direct bond or a linear or branched $C_1$-$C_4$ alkylene divalent radical;
$X_{AR}$ and each $X_2$ independently of others are a covalent bond or a covalent linkage of

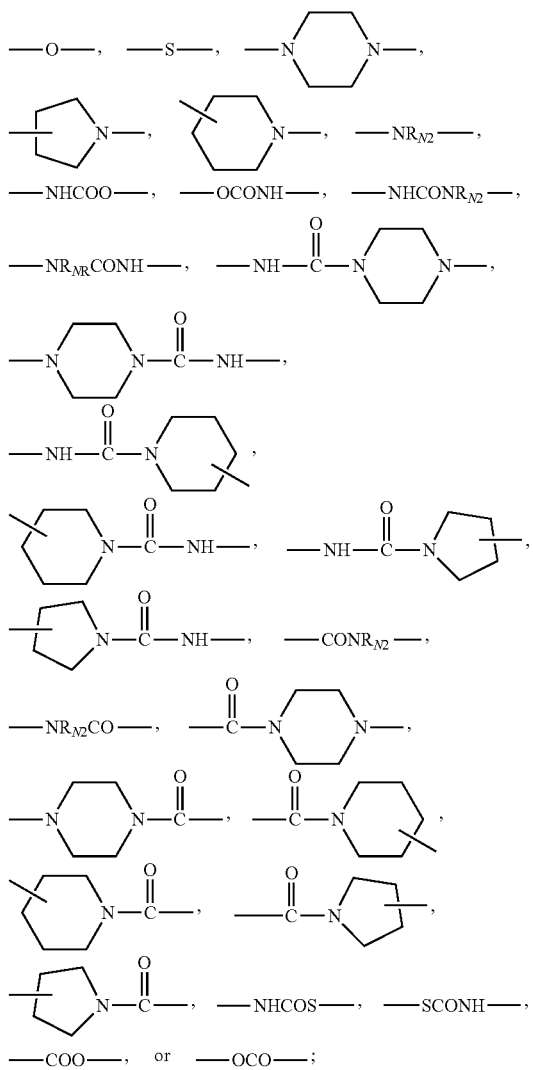

$R_{N2}$ is hydrogen, a linear or branched $C_1$-$C_6$ alkyl, cyclohexyl, cyclopentyl, a substituted or unsubstituted phenyl, or a substituted- or unsubstituted-phenyl-$C_1$-$C_6$ alkyl;
each $L_x$ independently is a linear or branched $C_1$-$C_{10}$ alkylene divalent radical which optionally has one or more hydroxyl or $C_1$-$C_4$-alkoxy groups or $C_1$-$C_4$-acylamino groups,

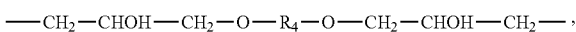
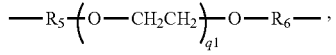

-continued $$—R_5\left(O—C_3H_6\right)_{q1}—O—R_6—,$$

or a divalent radical which optionally has one or more hydroxyl or $C_1$-$C_4$-alkoxy groups and is obtained by removal of two hydrogen atoms from two different atoms of a hydrocarbon that has up to 20 carbon atoms and comprises at least one divalent radical selected from the group consisting of cycloalkylene radical, substituted cycloalkylene radical, phenylene radical, substituted phenylene radical, cycloheteroalkylene radical, and substituted cycloheteroalkylene radical; and each $R_4$, $R_5$ and $R_6$ independent of one another are a linear or branched $C_1$-$C_{10}$ alkylene divalent radical which has zero or one hydroxyl group.

8. The embedded silicone hydrogel contact lens of claim 7, wherein in formula (1) a1 is zero and $X_0$ is O or $NR_{N1}$.

9. The embedded silicone hydrogel contact lens of claim 8, wherein in formula (1) ω1/(υ1+ω1) is from about 0.30 to about 0.95.

10. The embedded silicone hydrogel contact lens of claim 9, wherein in formula (1) AR is a phenyl group, a substituted phenyl group, a naphthyl group, a substituted naphthyl group, an anthracenyl group, a substituted anthracenyl group, a phenanthryl group, or a substituted phenanthryl group.

11. The embedded silicone hydrogel contact lens of claim 9, wherein in formula (1) AR is a monovalent radical of

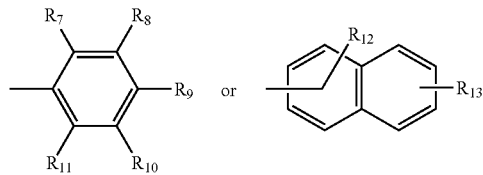

which $R_7$, $R_8$, $R_9$, $R_{10}$, $R_{11}$, $R_{12}$, and $R_{13}$ independent of one another are H, Cl, Br, F, $CF_3$, $CCl_3$, $C_1$-$C_5$ alkyl, $C_1$-$C_5$ alkoxy, $C_2$-$C_5$ acyloxy, OH, phenyl, phenoxy, benzyloxy, phenylcarbonyl, phenoxycarbonyl, phenylcarboxy (phenylcarbonyloxy), or naphthyl.

12. The embedded silicone hydrogel contact lens of claim 10, wherein the crosslinked polymeric material of the insert further comprises: (a) repeating units of at least one first hydrophobic non-silicone vinylic monomer; (b) repeating units of at least one first non-silicone vinylic crosslinker; (c) repeating units of at least one first polymerizable material selected from the group consisting of a first UV-absorbing vinylic monomer, a first UV/high-energy-violet-light ("HEVL") absorbing vinylic monomer, a first polymerizable photochromic compound, a first polymerizable tinting agent, and combinations thereof; or (d) combinations thereof.

13. The embedded silicone hydrogel contact lens of claim 10, wherein the silicone hydrogel bulk material comprises (1) repeating units of at least one silicone-containing polymerizable component that comprises at least 0.5 meq/g of H-bond donors and (2) repeating units of at least one hydrophilic vinylic monomer.

14. The embedded silicone hydrogel contact lens of claim 13, wherein the silicone-containing polymerizable component comprises a first silicone-containing vinylic monomer, a first silicone-containing vinylic crosslinker, or both, wherein the first silicone-containing vinylic monomer selected from the group consisting of [3-(meth)acryloxy-2-hydroxypropyloxy]propyl-bis(trimethylsiloxy)methylsilane, [3-(meth)acryloxy-2-hydroxypropyloxy]propyl-bis(trimethylsiloxy)butylsilane, 3-(meth)acryloxy-2-(2-hydroxyethoxy)-propyloxy)-propylbis(trimethylsiloxy) methylsilane, 3-(meth)acryloxy-2-hydroxypropyloxy)propyl-tris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy) propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl] (meth)acrylamide, N-[tris(dimethylethylsiloxy)-silylpropyl] (meth) acrylamide, N,N-bis[2-hydroxy-3-(3-(bis(trimethylsilyloxy) methylsilyl)-propyloxy)propyl]-2-methyl (meth) acrylamide, N,N-bis[2-hydroxy-3-(3-(bis(trimethylsilyloxy) methylsilyl)propyloxy)-propyl] (meth)acrylamide, N,N-bis [2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl] (meth) acrylamide, N-[2-hydroxy-3-(3-(t-butyldimethylsilyl) propyloxy)-propyl]-2-methyl (meth)acrylamide, N-[2-hydroxy-3-(3-(t-butyldimethylsilyl)propyloxy)-propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silyl carbamate, 3-[tris(trimethylsiloxy)silyl]propylvinyl carbamate, 3-[tris(trimethylsiloxy)silyl] propyl allyl carbamate, α-(meth)acryloxy-terminated ω-$C_1$-$C_6$-hydroxyalkyl terminated polydimethylsiloxanes having a number average molecular weight of 2000 daltons or less, α-(meth)acrylamido-terminated ω-$C_1$-$C_6$-hydroxyalkyl terminated polydimethylsiloxanes having a number average molecular weight of 2000 daltons or less, α-(meth)acryloxy-2-hydroxypropyloxypropyl terminated ω-$C_1$-$C_4$-alkyl terminated polydimethylsiloxanes having a number average molecular weight of 2000 daltons or less, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxanes having a number average molecular weight of 2000 daltons or less, α-[3-(meth)acryloxy-propyloxy-2-hydroxypropyloxypropyl]-terminated ω-$C_1$-$C_4$-alkyl terminated polydimethylsiloxanes having a number average molecular weight of 2000 daltons or less, α-[3-(meth) acryloxyisopropyloxy-2-hydroxypropyloxypropyl]-terminated ω-$C_1$-$C_4$-alkyl terminated polydimethylsiloxane having a number average molecular weight of 2000 daltons or less, α-[3-(meth)acryloxybutyloxy-2-hydroxypropyloxypropyl]-terminated ω-$C_1$-$C_4$-alkyl terminated polydimethylsiloxanes having a number average molecular weight of 2000 daltons or less, α-[3-(meth)acryloxyethylamino-2-hydroxypropyloxypropyl]-terminated ω-$C_1$-$C_4$-alkyl terminated polydimethylsiloxanes having a number average molecular weight of 2000 daltons or less, α-[3-(meth) acryloxypropylamino-2-hydroxypropyloxy-propyl]-terminated ω-$C_1$-$C_4$-alkyl terminated polydimethylsiloxanes having a number average molecular weight of 2000 daltons or less, α-[3-(meth)acryloxy-butylamino-2-hydroxypropyloxypropyl]-terminated ω-$C_1$-$C_4$-alkyl terminated polydimethylsiloxanes having a number average molecular weight of 2000 daltons or less, α-(meth)acryloxy-(polyethylenoxy)-2-hydroxypropyloxypropyl]-terminated ω-$C_1$-$C_4$-alkyl terminated polydimethylsiloxanes having a number average molecular weight of 2000 daltons or less, α-[(meth)acryloxy-2-hydroxypropyloxy-ethoxypropyl]-terminated ω-$C_1$-$C_4$-alkyl terminated polydimethylsiloxanes having a number average molecular weight of 2000 daltons or less, α-[(meth)acryloxy-2-hydroxypropyl-N-ethylaminopropyl]-terminated ω-$C_1$-$C_4$-alkyl terminated polydimethylsiloxanes having a number average molecular weight of 2000 daltons or less, α-[(meth)acryloxy-2-hydroxypropyl-aminopropyl]-terminated ω-$C_1$-$C_4$-alkyl terminated polydimethylsiloxanes having a number average molecular weight of 2000 daltons or less, α-[(meth)acryloxy-2-hydroxypropyloxy-(polyethylenoxy)propyl]-terminated ω-$C_1$-$C_4$-alkyl terminated polydimethylsiloxanes having a number average molecular weight of 2000 daltons or less, α-(meth)acrylamidopropyloxypropyl terminated ω-$C_1$-$C_4$-alkyl terminated polydimethylsiloxanes having a number average molecular weight of 2000 daltons or less, α-[3-(meth)acrylamidoethoxy-2-hydroxypropyloxy-propyl]-terminated ω-$C_1$-$C_4$-alkyl polydimethylsiloxanes having a number average molecular weight of 2000 daltons or less, α-[3-(meth)acrylamidopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidoisopropyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamidobutyloxy-2-hydroxypropyloxypropyl]-terminated ω-$C_1$-$C_4$-alkyl terminated polydimethylsiloxanes having a number average molecular weight of 2000 daltons or less, α-[3-(meth)acrylamido-2-hydroxypropyloxypropyl] terminated ω-$C_1$-$C_4$-alkyl polydimethylsiloxanes having a number average molecular weight of 2000 daltons or less, α-[3-[N-methyl-(meth)acrylamido]-2-hydroxypropyloxypropyl] terminated ω-$C_1$-$C_4$-alkyl terminated polydimethylsiloxanes having a number average molecular weight of 2000 daltons or less, N-(2,3-dihydroxypropane)-N'-(propyltetra(dimethylsiloxy)-dimethylbutylsilane) (meth)acrylamide, (meth)acrylamidopropyltetra(dimethylsiloxy)-dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, and combinations thereof, wherein the first silicone-containing vinylic crosslinker selected from the group consisting of di-(meth)acrylamido-terminated polysiloxane vinylic crosslinkers having a number average molecular weight of 4000 Daltons or less, α,ω-bis[3-(meth)acryloxy-2-hydroxypropyloxypropyl]-terminated polydimethylsiloxanes having a number average molecular weight of 4000 Daltons or less, α,ω-bis[3-(meth)acryloxyethoxy-2-hydroxypropyloxypropyl]-terminated polydimethylsiloxanes having a number average molecular weight of 4000 Daltons or less, α,ω-bis [3-(meth)acryloxypropyloxy-2-hydroxypropyloxypropyl]-terminated polydimethylsiloxanes having a number average molecular weight of 4000 Daltons or less, α,ω-bis[3-(meth)acryloxy-isopropyloxy-2-hydroxypropyloxypropyl]-terminated polydimethylsiloxanes having a number average molecular weight of 4000 Daltons or less, α,ω-bis[3-(meth)acryloxybutyloxy-2-hydroxypropyloxypropyl]-terminated polydimethylsiloxanes having a number average molecular weight of 4000 Daltons or less, α,ω-bis[3-(meth)acrylamidoethoxy-2-hydroxypropyloxypropyl]-terminated polydimethylsiloxanes having a number average molecular weight of 8000 Daltons or less, α,ω-bis[3-(meth)acrylamidopropyloxy-2-hydroxypropyloxypropyl]-terminated polydimethylsiloxanes having a number average molecular weight of 8000 Daltons or less, α,ω-bis[3-(meth)acrylamidoisopropyloxy-2-hydroxypropyloxypropyl]-terminated polydimethylsiloxanes having a number average molecular weight of 4000 Daltons or less, α,ω-bis[3-(meth)acrylamidobutyloxy-2-hydroxypropyloxypropyl]-terminated polydimethylsiloxanes having a number average molecular weight of 8000 Daltons or less, α,ω-bis[3-(meth)acryloxyethylamino-2-hydroxypropyloxypropyl]-terminated polydimethylsiloxanes having a number average molecular weight of 8000 Daltons or less, α,ω-bis[3-(meth)acryloxypropylamino-2-hydroxypropyloxypropyl]-terminated polydimethylsiloxanes having a number average molecular weight of 8000 Daltons or less, α,ω-bis[3-(meth)acryloxybutylamino-2-hydroxypropyloxypropyl]-terminated polydimethylsiloxanes having a number average molecular weight of 8000 Daltons or less, α,ω-bis[(meth)acrylamidoethylamino-2-hydroxypropyloxy-propyl]-terminated polydimethylsiloxanes having a number average molecular weight of 12000 Daltons or less, α,ω-bis[3-(meth)acrylamidopropylamino-2-hydroxypropyloxypropyl]-terminated polydimethylsiloxanes having a number average molecular weight of 4000 Daltons or less, α,ω-bis [3-(meth)acrylamide-butylamino-2-hydroxypropyloxypropyl]-terminated polydimethylsiloxanes having a number average molecular weight of 4000 Daltons or less, α,ω-bis [(meth)acryloxy-2-hydroxypropyloxy-ethoxypropyl]-terminated polydimethylsiloxanes having a number average molecular weight of 4000 Daltons or less, α,ω-bis[(meth)acryloxy-2-hydroxypropyl-N-ethylaminopropyl]-terminated polydimethylsiloxanes having a number average molecular weight of 12000 Daltons or less, α,ω-bis[(meth)acryloxy-2-hydroxypropyl-aminopropyl]-polydimethylsiloxanes having a number average molecular weight of 8000 Daltons or less, α,ω-bis[(meth)acryloxy-2-hydroxypropyloxy-(polyethylenoxy)propyl]-terminated polydimethylsiloxane having a number average molecular weight of 4000 Daltons or less, α,ω-bis[(meth)acryloxyethyl-amino-carbonyloxy-ethoxypropyl]-terminated polydimethylsiloxanes having a number average molecular weight of 4000 Daltons or less, α,ω-bis[(meth)acryloxyethylamino-carbonyloxy-(polyethylenoxy)propyl]-terminated polydimethylsiloxanes having a number average molecular weight of 4000 Daltons or less, di-(meth)acryloyloxy-terminated or di-(meth)acrylamido-terminated chain-extended polysiloxane vinylic crosslinkers each of which comprises at least two polysiloxane segments and linkages between each pair of polysiloxane segments and between one (meth)acryloyloxy group and one polysiloxane segment and each linkage has at least one H-bond donor, a polysiloxane vinylic crosslinkers having dimethylsiloxane units and hydrophilized siloxane units each having one methyl substituent and one monovalent $C_4$-$C_{40}$ organic radical substituent having at least one H-bond donor (preferably 2 to 6 hydroxyl groups), and combinations thereof.

15. The embedded silicone hydrogel contact lens of claim 13, wherein the silicone-containing polymerizable component comprises a first silicone-containing vinylic crosslinker that comprises at least two urethane linkages (—O—CO—NH—), at least two urea linkages (—NH—CO—NH—), at least two hydroxyl groups, or combinations thereof.

16. The embedded silicone hydrogel contact lens of claim 13, wherein said at least one hydrophilic vinylic monomer comprises at least one alkyl (meth)acrylamide, at least one hydroxyl-containing acrylic monomer, at least one amino-containing acrylic monomer, at least one carboxyl-containing acrylic monomer, at least one N-vinyl amide monomer, at least one methylene-containing pyrrolidone monomer, at least one acrylic monomer having a $C_1$-$C_4$ alkoxyethoxy group, at least one vinyl ether monomer, at least one allyl ether monomer, at least one phosphorylcholine-containing vinylic monomer, N-2-hydroxyethyl vinyl carbamate, N-carboxyvinyl-β-alanine (VINAL), N-carboxyvinyl-α-alanine, or combinations thereof.

17. The embedded silicone hydrogel contact lens of claim 13, wherein the silicone hydrogel bulk material further comprise: repeating units of at least one second silicone-containing vinylic monomer (other than the first silicone-containing vinylic monomer) and/or a second polysiloxane vinylic crosslinker (other than the first polysiloxane vinylic crosslinker); repeating units of at least one second hydrophobic non-silicone vinylic monomer; repeating units of at least one second non-silicone vinylic crosslinkers; repeating units of at least one second polymerizable material selected from the group consisting of a second UV-absorbing vinylic monomer, a second UV/high-energy-violet-light ("HEVL") absorbing vinylic monomer, a second polymerizable photochromic compound, a second polymerizable tinting agent (polymerizable dye), and combinations thereof; or combinations thereof.

18. The embedded silicone hydrogel contact lens of claim 17, wherein said at least one first non-silicone vinylic crosslinker and said at least one second non-silicone vinylic crosslinker independent of each other are selected from the group consisting of allyl methacrylate, allyl acrylate, triallyl isocyanurate, 2,4,6-triallyloxy-1,3,5-triazine, 1,2,4-trivinylcyclohexane, ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

19. The embedded silicone hydrogel contact lens of claim 12, wherein said at least one first non-silicone vinylic crosslinker and said at least one second non-silicone vinylic crosslinker independent of each other are selected from the group consisting of allyl methacrylate, allyl acrylate, triallyl isocyanurate, 2,4,6-triallyloxy-1,3,5-triazine, 1,2,4-trivinylcyclohexane, ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

\* \* \* \* \*